US012447736B2

(12) United States Patent
Kim et al.

(10) Patent No.: US 12,447,736 B2
(45) Date of Patent: Oct. 21, 2025

(54) PRINTING PAD, MANUFACTURING METHOD THEREOF AND WINDOW MANUFACTURING METHOD USING THE SAME

(71) Applicant: Samsung Display Co., Ltd., Yongin-Si (KR)

(72) Inventors: Junyoung Kim, Suwon-si (KR); Jusuk Oh, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/667,739

(22) Filed: Feb. 9, 2022

(65) Prior Publication Data

US 2022/0266587 A1 Aug. 25, 2022

(30) Foreign Application Priority Data

Feb. 10, 2021 (KR) ........................ 10-2021-0018900
Oct. 25, 2021 (KR) ........................ 10-2021-0143061

(51) Int. Cl.
*B41F 17/00* (2006.01)

(52) U.S. Cl.
CPC .................................. *B41F 17/001* (2013.01)

(58) Field of Classification Search
CPC ..... B41F 17/001; B41N 2207/02; B41N 1/12; G09F 9/30
See application file for complete search history.

(56) References Cited

U.S. PATENT DOCUMENTS 6,158,341 A * 12/2000 Holmberg ............. B41F 17/001 101/35
7,870,823 B1 * 1/2011 Cameron .............. B41F 17/006 101/379
8,820,230 B2 9/2014 Inoue et al.
11,975,528 B2 5/2024 Shim et al.
2020/0347250 A1 11/2020 Choi et al.
2021/0023835 A1 * 1/2021 Choi ..................... B41F 17/001

FOREIGN PATENT DOCUMENTS

CN 1279635 A 1/2001
CN 103753948 A 4/2014
CN 111572225 A 8/2020
(Continued)

OTHER PUBLICATIONS

Chinese Patent Office Examination Report Cited in Related Chinese Application No. 202210122285.0 Dated Jul. 25, 2025.

*Primary Examiner* — Stephen D Meier
*Assistant Examiner* — Quang X Nguyen
(74) *Attorney, Agent, or Firm* — F. CHAU & ASSOCIATES, LLC

(57) ABSTRACT

A printing pad includes a bottom surface extending in a plane defined in a first direction and a second direction intersecting the first direction. A first upper surface faces the bottom surface. A first side surface connects the bottom surface and the first upper surface. A second portion is disposed on the first portion and includes a second upper surface facing the first upper surface and a second side surface connecting the first upper surface and the second upper surface. A width of the second portion in the first direction increases from the first upper surface towards the second upper surface.

18 Claims, 26 Drawing Sheets

(56) References Cited

FOREIGN PATENT DOCUMENTS

| | | | |
|---|---|---|---|
| CN | 112277442 | A | 1/2021 |
| JP | 5552177 | | 7/2014 |
| JP | 2019098792 | | 6/2019 |
| KR | 10-0093237 | | 12/1995 |
| KR | 10-0663398 | | 1/2007 |
| KR | 10-1189752 | | 10/2012 |
| KR | 10-1193981 | | 10/2012 |
| KR | 10-2013-0026238 | | 3/2013 |
| KR | 10-1418976 | | 7/2014 |
| KR | 101-898041 | | 9/2018 |
| KR | 10-2020-0128255 | | 11/2020 |
| KR | 10-2021-0024271 | | 3/2021 |
| KR | 10-2021-0030688 | | 3/2021 |

* cited by examiner

PRINTING PAD, MANUFACTURING METHOD THEREOF AND WINDOW MANUFACTURING METHOD USING THE SAME

CROSS-REFERENCE TO RELATED APPLICATIONS

This application claims priority under 35 U.S.C. § 119 to Korean Patent Application No. 10-2021-0018900, filed on Feb. 10, 2021 in the Korean Intellectual Property Office and Korean Patent Application No. 10-2021-0143061, filed on Oct. 25, 2021 in the Korean Intellectual Property Office, the disclosure of which is incorporated by reference in its entirety herein.

1. Technical Field

The present inventive concept herein relates to a printing pad having increased printing performance, a manufacturing method thereof, and a window manufacturing method using the same.

2. Discussion of Related Art

An electronic device may include a window disposed on a display panel to protect the display panel from external impact. The window may be disposed on the outer surface of the electronic device. Since the window forms an external surface of the electronic device, the window directly affects the design of the device.

Accordingly, a pattern may be formed on the window for protecting the display panel and to add various designs to the electronic device. For example, ink may be transferred onto the window using a printing pad to form a pattern on the window.

However, the application of ink on the window may not provide a clear pattern and there may be considerable defect rates for the window manufacturing process.

SUMMARY

The present inventive concept provides a printing pad and a manufacturing method thereof that forms a clear printing pattern without any unprinted portions on a window.

The present inventive concept also provides a window manufacturing method capable of forming a clear printing pattern on a side portion bent at an angle in a range of about 90° or greater.

An embodiment of the present inventive concept provides a printing pad including a first portion including a bottom surface extending in a plane defined in a first direction and a second direction intersecting the first direction, a first upper surface facing the bottom surface, and a first side surface connecting the bottom surface and the first upper surface. A second portion is disposed on the first portion and includes a second upper surface facing the first upper surface and a second side surface connecting the first upper surface and the second upper surface. A width of the second portion in the first direction increases from the first upper surface towards the second upper surface.

In an embodiment, an angle of the second side surface with respect to a third direction perpendicular to the bottom surface may be in a range of about 10° to about 12°.

In an embodiment, each of the first portion and the second portion may include rubber or silicone.

In an embodiment, a first material included in the first portion and a second material included in the second portion may be different from each other.

In an embodiment, a hardness of the first portion may be in a range of about 20 sh A to about 35 sh A. A hardness of the second portion may be in a range of about 7 sh A to about 15 sh A.

In an embodiment, the width of the first portion in the first direction may decrease from the bottom surface toward the first upper surface.

In an embodiment, a planar area of the bottom surface in the plane defined in the first direction and the second direction is greater than a planar area of the first upper surface in the plane defined in the first direction and the second direction. A planar area of the second upper surface in the plane defined in the first direction and the second direction is greater than the planar area of the first upper surface in the plane defined in the first direction and the second direction.

In an embodiment, the second upper surface may have a curved shape protruding in a direction away from the first portion.

In an embodiment, the first side surface may include a first sub-side surface extending from the bottom surface and having a first slope from the bottom surface. A second sub-side surface extends from the first sub-side surface and is directly connected to the first upper surface. The second sub-side surface has a second slope that is less than the first slope.

In an embodiment, the first portion may have a first height with respect to the third direction perpendicular to the bottom surface, the second portion may have a second height with respect to the third direction, and a ratio of the first height to the second height may be in a range of about 5:5 to about 7:3.

In an embodiment of the present inventive concept, a window manufacturing method includes adhering ink to a printing pad and pressurizing the printing pad to which the ink is adhered on a window base portion of the window to provide a printing pattern on the window base portion. The printing pad includes a first portion including a bottom surface extending in a plane defined in a first direction and a second direction intersecting the first direction, a first upper surface facing the bottom surface, and a first side surface connecting the bottom surface and the first upper surface. A second portion is disposed on the first portion and includes a second upper surface facing the first upper surface and a second side surface connecting the first upper surface and the second upper surface. A width of the second portion in the first direction increases from the first upper surface towards the second upper surface.

In an embodiment, the adhering of ink to the printing pad includes adhering the ink to the second side surface of the second portion.

In an embodiment, the adhering of the ink to the printing pad may include disposing the ink on a printing plate, and pressurizing the printing pad on the printing plate.

In an embodiment, the method may further includes adhering additional ink to an additional printing pad and pressurizing the additional printing pad to which the additional ink is adhered on the window base portion having the printing pattern to provide an additional printing pattern on the printing pattern.

In an embodiment, the additional printing pad may include a third portion and a fourth portion disposed on the third portion. A width of the fourth portion in the first direction may decrease as a distance from the third portion increases, or the width of the fourth portion in the first direction may remain the same as a distance from the third portion increases.

In an embodiment, the adhering of additional ink to an additional printing pad may include disposing the additional ink on an additional printing plate, and pressurizing the additional printing pad on the additional printing plate. The ink may be provided as a plurality of patterns spaced apart at a first interval on the printing plate. The additional ink may be provided as a plurality of patterns spaced apart at a second interval on the additional printing plate. The second interval may be less than the first interval.

In an embodiment, the window base portion may include a main transmissive portion extending in a plane defined in the first direction and the second direction. At least one side transmissive portion extends from the main transmissive portion and is bent to a predetermined curvature. An angle formed by an end of the at least one side transmissive portion with respect to the plane of the main transmissive portion may be in a range of about 90° or greater.

In an embodiment of the present inventive concept, a printing pad manufacturing method includes providing a mold having a first opening having a first width in a first direction and a second opening having a second width that is less than the first width in the first direction. An elastic material is provided into each of the first opening and the second opening. The elastic material is dried. The second width of the second opening may increase as a distance from the first opening increases.

In an embodiment, the providing of an elastic material may include providing a first elastic material into the second opening, and providing a second elastic material into the first opening. The first elastic material may have a smaller hardness than the second elastic material.

In an embodiment, the drying of the elastic material may include drying the first elastic material provided into the second opening, and drying the second elastic material provided into the first opening.

According to an embodiment of the present inventive concept, a system for manufacturing a window for a display device includes a printing pad configured to provide a printing pattern on the window. The printing pad includes a first portion having a bottom surface and a first upper surface and a second portion disposed on the first upper surface and including a second upper surface facing the first upper surface and a second side surface connecting the first upper surface and the second upper surface. An angle of the second side surface with respect to a direction perpendicular to the bottom surface is in a range of about 10° to about 12°. The window includes a window base portion having a main transmissive portion extending in a plane defined in a first direction and a second direction intersecting the first direction. At least one side transmissive portion extends from the main transmissive portion and is bent to a predetermined curvature. An angle formed by an end of the at least one side transmissive portion with respect to the plane of the main transmissive portion is in a range of about 90° or greater. The second side surface is configured to provide the printing pattern on the at least one side transmissive portion of the window base portion when the printing pad is pressurized on the window base portion.

In an embodiment, an additional printing pad is configured to provide an additional printing pattern on a portion of the printing pattern provided on the at least one side transmissive portion when the additional printing pad is pressurized on the window. The additional printing pad includes a third portion and a fourth portion disposed on the third portion.

BRIEF DESCRIPTION OF THE DRAWINGS

The accompanying drawings are included to provide a further understanding of the present inventive concept, and are incorporated in and constitute a part of this specification. The drawings illustrate embodiments of the present inventive concept and, together with the description, serve to explain principles of the present inventive concept. In the drawings.

DETAILED DESCRIPTION OF EMBODIMENTS

Figure 1:
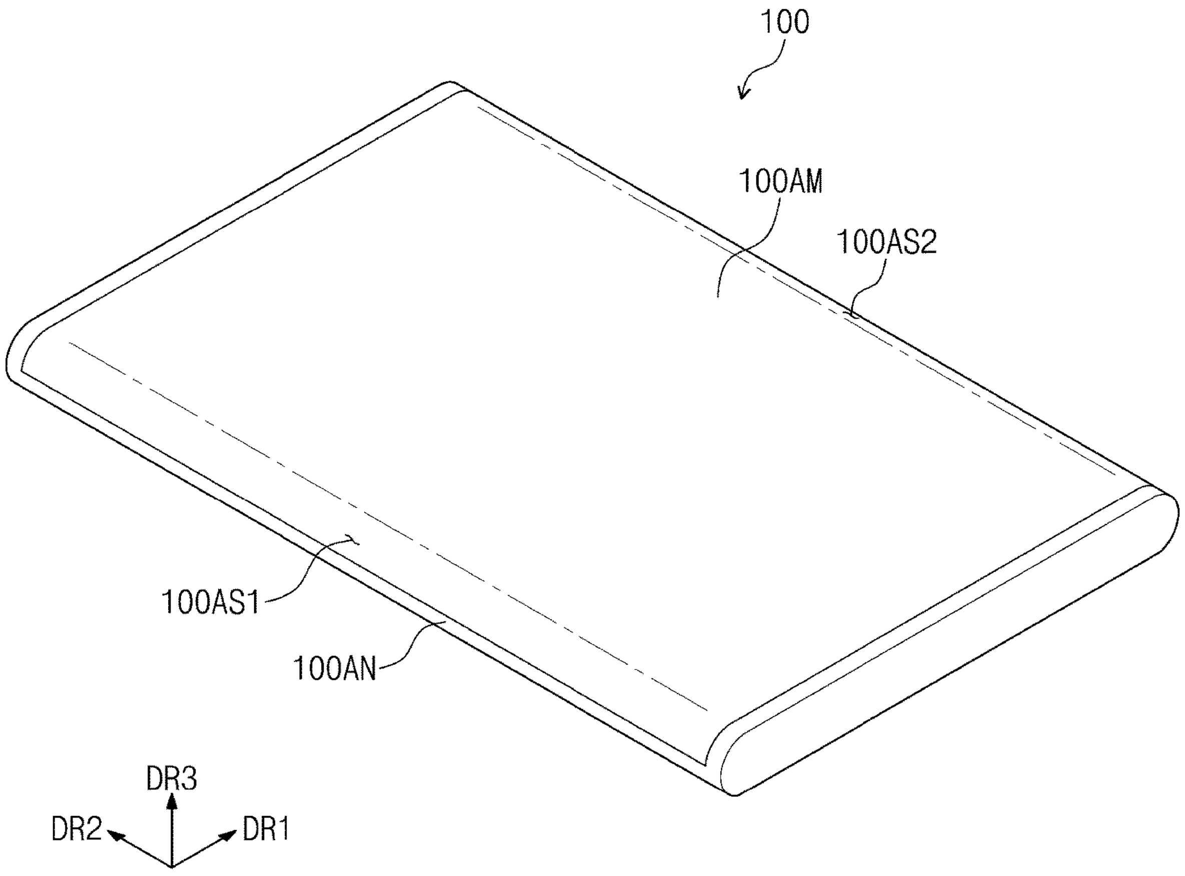
FIG. 1 is a perspective view of a display device according to an embodiment of the present inventive concept.

In the present disclosure, when an element (or a region, a layer, a portion, etc.) is referred to as being "on," "connected to," or "coupled to" another element, it means that the element may be directly disposed on/connected to/coupled to the other element, or that a third element may be disposed therebetween. When an element (or a region, a layer, a portion, etc.) is referred to as being "directly on," "directly connected to," or "directly coupled to" another element, no third element (e.g., an intervening element) may be disposed therebetween.

Like reference numerals refer to like elements. Also, in the drawings, the thickness, the ratio, and the dimensions of elements may be exaggerated for convenience of explanation The term "and/or" includes any and all combinations of one or more of which associated elements may define.

It will be understood that, although the terms "first", "second", etc. may be used herein to describe various elements, these elements should not be limited by these terms. These terms are only used to distinguish one element from another. For example, a first element may be referred to as a second element, and a second element may also be referred to as a first element in a similar manner without departing the scope of the present inventive concept. The terms of a singular form may include plural forms unless the context clearly indicates otherwise.

In addition, terms such as "below," "lower," "above," "upper," and the like are used to describe the relationship of elements shown in the drawings. The terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, an embodiment of the present inventive concept will be described with reference to the accompanying drawings.

Figure 2:
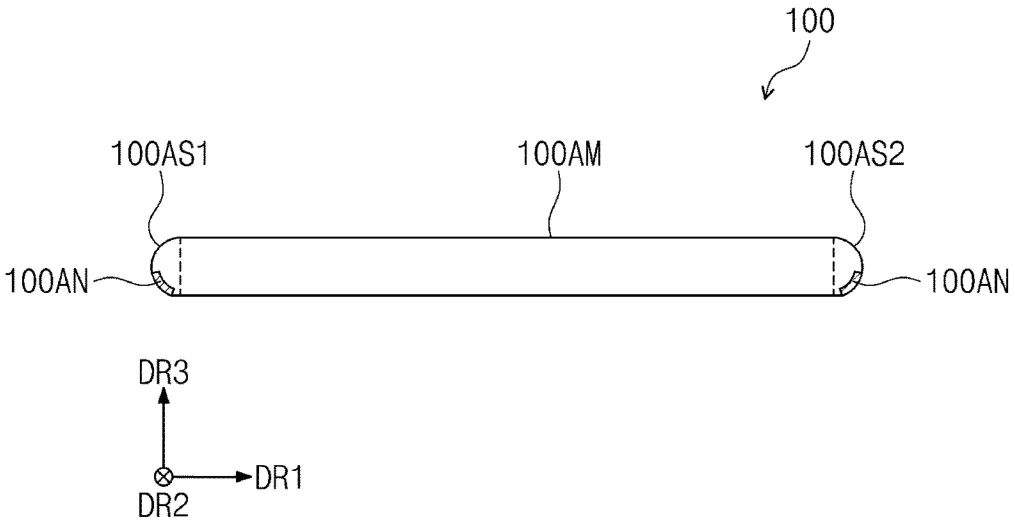
FIG. 2 is a cross-sectional view of a display device according to an embodiment of the present inventive concept.

FIG. 1 is a perspective view of a display device according to an embodiment of the present inventive concept. FIG. 2 is a cross-sectional view of a display device according to an embodiment of the present inventive concept.

Referring to FIG. 1 and FIG. 2, a display device 100 may be a device activated by an electrical signal. For example, in an embodiment, the display device 100 may be a mobile phone, a tablet computer, a car navigation system unit, a game console, or a wearable device. However, embodiments of the present inventive concept are not limited thereto and the display device 100 may be various small, medium or large-sized electronic devices. In the embodiment of FIG. 1, the display device 100 is illustrated as a mobile phone for convenience of explanation.

In the display device 100, a display region may be defined. The display device 100 may display an image through the display region, and may receive an external input. The display region may include a main display region 100AM, a first sub-display region 100AS1, and a second sub-display region 100AS2. The display device 100 may include a non-display region 100AN adjacent to the display region. As illustrated in FIG. 1, the non-display region 100AN may have a shape surrounding the edge of the display region. However, embodiments of the present inventive concept are not limited thereto. For example, in an embodiment the non-display region 100AN may be defined to be adjacent only to the first sub-display region 100AS1 and the second sub-display region 100AS2.

As shown in the embodiment of FIG. 1, the main display region 100AM may extend substantially in a plane defined by a first direction DR1 and a second direction DR2 that intersects the first direction DR1. For example, the main display region 100AM may have relatively long sides extending longitudinally in the second direction DR2 and relatively short sides extending longitudinally in the first direction DR1. However, embodiments of the present inventive concept are not limited thereto and the main display region 100AM may have various different polygonal, circular or irregular shapes. A third direction DR3 intersecting both the first direction DR1 and the second direction DR2 may be defined as a third direction of the display device 100 which may be a thickness direction of the display device 100. While the first to third directions DR1 to DR3 are illustrated as being perpendicular to each other, embodiments of the present inventive concept are not limited thereto and the first to third directions DR1 to DR3 may intersect each other at various different angles, respectively. Unlike the embodiment illustrated in FIG. 1, the main display region 100AM may have a shape that is concavely or convexly curved with respect to a plane defined by the first direction DR1 and the second direction DR2. For example, the main display region 100AM may have a shape convexly protruding in the third direction DR3 from a plane defined by the first direction DR1 and the second direction DR2.

The first sub-display region 100AS1 and the second sub-display region 100AS2 may be bent from the main display region 100AM. In an embodiment, the main display region 100AM, the first sub-display region 100AS1, and the second sub-display region 100AS2 may be adjacent to each other to implement a continuous display region. Each of the first sub-display region 100AS1 and the second sub-display region 100AS2 may be bent from the main display region 100AM to have a predetermined curvature (e.g., in the third direction DR3). The curvatures of the first sub-display region 100AS1 and the second sub-display region 100AS2 may be the same, or may be different from each other.

As shown in the embodiment of FIG. 1, each of the first sub-display region 100AS1 and the second sub-display region 100AS2 extend longitudinally along the second direction DR2, and may be spaced apart from each other in the first direction DR1 with the main display region 100AM interposed therebetween. Each of the first sub-display region 100AS1 and the second sub-display region 100AS2 may be positioned adjacent to a relatively long side of the main display region 100AM.

The embodiment of FIG. 1 illustrates that the display device 100 includes one main display region 100AM and two sub-display regions, such as the first sub-display region 100AS1 and the second sub-display region 100AS2. However, embodiments of the present inventive concept are not limited thereto. For example, the display device 100 includes the first sub-display region 100AS1 and the second sub-display region 100AS2 positioned adjacent to the relatively long sides of the main display region 100AM, and may further include a third sub-display region and/or a fourth sub-display region positioned adjacent to the relatively short sides of the main display region 100AM. The third sub-display region and the fourth sub-display region may be spaced apart along the second direction DR2, and may each extend longitudinally along the first direction DR1.

Figure 3:
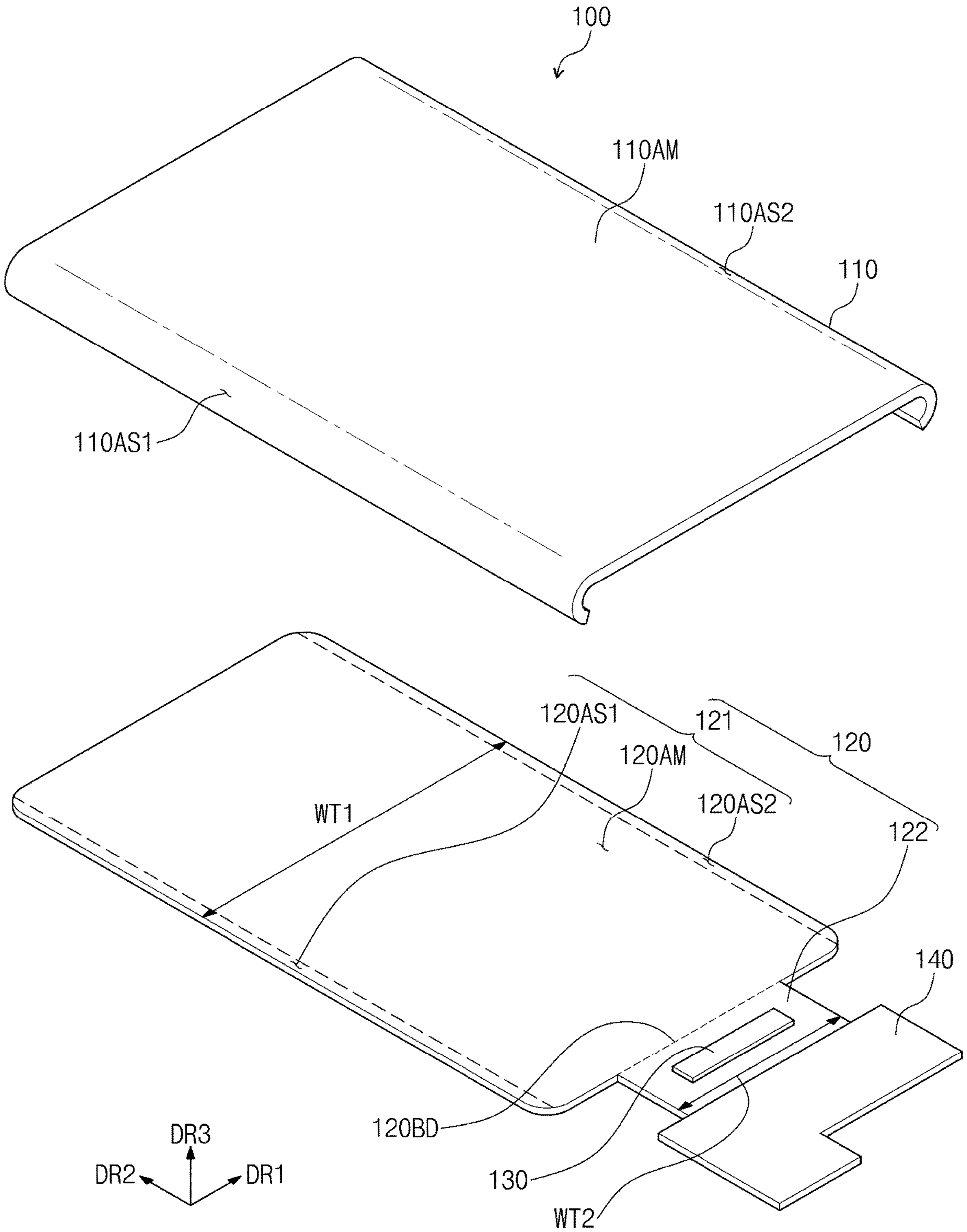
FIG. 3 is an exploded perspective view illustrating some elements of a display device according to an embodiment of the present inventive concept.

FIG. 3 is an exploded perspective view illustrating some elements of a display device according to an embodiment of the present inventive concept.

Referring to FIG. 3, the display device 100 may include a window 110, a display panel 120, a driving chip 130, and a main circuit board 140.

In an embodiment, the window 110 may include an optically transparent insulation material, and the window 110 may include glass or plastic. The window 110 may have a multi-layered structure or a single-layered structure.

The window 110 includes a main transmissive portion 110AM, and a first side transmissive portion 110AS1 and a second side transmissive portion 110AS2 which are bent and extended from the main transmissive portion 110AM. In an embodiment, each of the first side transmissive portion 110AS1 and the second side transmissive portion 110AS2 may have a predetermined curvature. The curvatures of the first side transmissive portion 110AS1 and the second side transmissive portion 110AS2 may be the same, or may be different from each other. However, embodiments of the present inventive concept are not limited thereto. For example, the first side transmissive portion 110AS1 and the second side transmissive portion 110AS2 may be planes.

Each of the first side transmissive portion 110AS1 and the second side transmissive portion 110AS2 may extend longitudinally along the second direction DR2, and may be spaced apart from each other in the first direction DR1 with the main transmissive portion 110AM interposed therebetween. In an embodiment, each of the first side transmissive portion 110AS1 and the second side transmissive portion 110AS2 may be positioned adjacent to a relatively long side of the main transmissive portion 110AM. In an embodiment, the window 110 may further include a third side transmissive portion and a fourth side transmissive portion positioned adjacent to the relatively short sides of the main transmissive portion 110AM. Each of the third side transmissive portion and the fourth side transmissive portion may extend longitudinally along the first direction DR1, and may be spaced apart from each other in the second direction DR2 with the main transmissive portion 110AM interposed therebetween.

As shown in the embodiment of FIG. 3, the display panel 120 is disposed below the window 110, and may be adhered to the window 110. The display panel 120 may be an element which substantially generates an image. In an embodiment, the display panel 120 may be a light emitting type display panel. For example, the display panel 120 may be an organic light emitting display panel, a quantum-dot light emitting display panel, a micro-LED display panel, or a nano-LED display panel. However, embodiments of the present inventive concept are not limited thereto and the display panel 120 may be various other types of display panels.

The display panel 120 may include a first portion 121 and a second portion 122. The first portion 121 and the second portion 122 may be arranged in the second direction DR2. For example, as shown in the embodiment of FIG. 3, the second portion 122 may be a portion protruded and extended from the first portion 121 in the second direction DR2, and the first portion 121 and the second portion 122 may have a continuous shape (e.g., an integral shape). In an embodiment, a width WT1 of the first portion 121 (e.g., length in the first direction DR1) may be greater than a width WT2 of the second portion 122 (e.g., length in the first direction DR1). Therefore, the length of a boundary 120BD (e.g., in the first direction DR1) between the first portion 121 and the second portion 122 (e.g., in the second direction DR2) may be less than the width WT1 of the first portion 121.

The first portion 121 of the display panel 120 may include a main display region 120AM, a first side display region 120AS1, and a second side display region 120AS2. The main display region 120AM, the first side display region 120AS1, and the second side display region 120AS2 may provide an image towards the window 110 for viewing by the user. In an embodiment, the display panel 120 may further have a non-display region surrounding the main display region 120AM, the first side display region 120AS1, and the second side display region 120AS2. The non-display region of the display panel 120 may be a portion corresponding to the non-display region 10AN of the display device 100 (see FIG. 1).

The window 110 may be adhered to the first portion 121 of the display panel 120. In an embodiment, the first portion 121 may be adhered to the main transmissive portion 110AM, the first side transmissive portion 110AS1, and the second side transmissive portion 110AS2. For example, the main display region 120AM may be adhered to the main transmissive portion 110AM, and the first side display region 120AS1 and the second side display region 120AS2 may be respectively adhered to the first side transmissive portion 110AS1 and the second side transmissive portion 110AS2.

The second portion 122 may not be adhered to the window 110 and may be bent towards a rear surface of the first portion 121. In an embodiment, the second portion 122 may have a driving chip 130 mounted thereon, and may have a main circuit board 140 adhered thereto. For example, the driving chip 130 may be a timing control circuit in the form of a chip. However, embodiments of the present inventive concept are not limited thereto. The driving chip 130 may be mounted on a separate film from the display panel 120. In this embodiment, the driving chip 130 may be electrically connected to the display panel 120 through the film.

Figure 4:
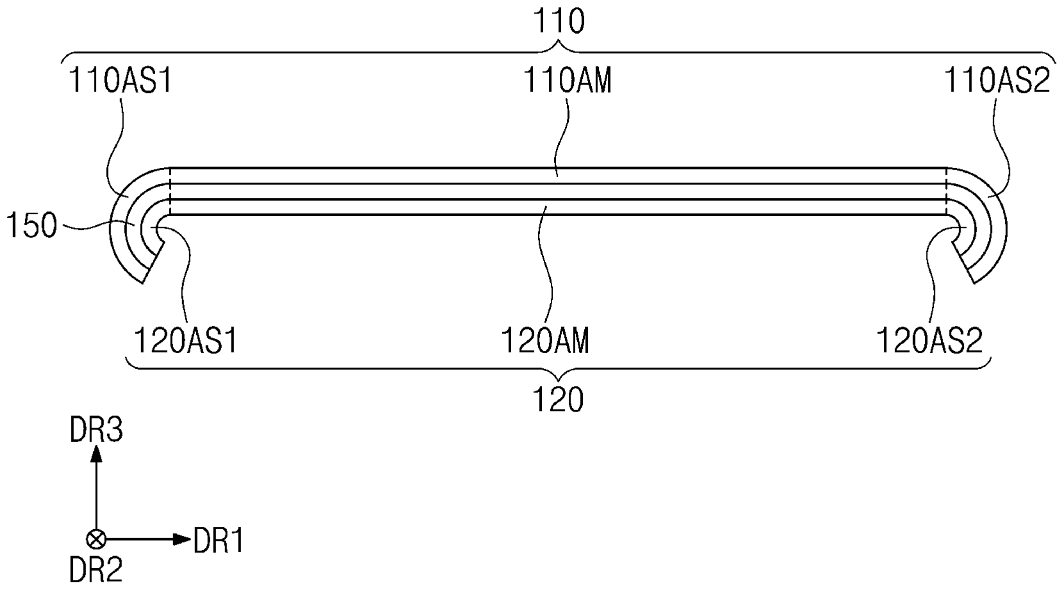
FIG. 4 is a cross-sectional view illustrating some elements of a display device according to an embodiment of the present inventive concept.

FIG. 4 is a cross-sectional view illustrating some elements of a display device according to an embodiment of the present inventive concept.

FIG. 4 illustrates a state in which the window 110 and the display panel 120 are adhered by an adhesive layer 150. In an embodiment, the adhesive layer 150 may include a typical adhesive or a pressure-sensitive adhesive. For example, the adhesive layer 150 may be a transparent adhesive member such as a pressure sensitive adhesive film (PSA), an optically clear adhesive film (OCA), or an optically clear resin (OCR). However, embodiments of the present inventive concept are not limited thereto.

The window 110 and the display panel 120 may be adhered to each other by the adhesive layer 150. A portion corresponding to the window 110 and a portion corresponding to the display panel 120 may be adhered to each other by the adhesive layer 150. For example, in an embodiment, the main transmissive portion 110AM of the window 110 may be adhered to the main display region 120AM with the adhesive layer 150 interposed therebetween, the first side transmissive portion 110AS1 of the window 110 may be adhered to the first side display region 120AS1 with the adhesive layer 150 interposed therebetween, and the second side transmissive portion 110AS2 of the window 110 may be adhered to the second side display region 120AS2 with the adhesive layer 150 interposed therebetween.

Figure 5A:
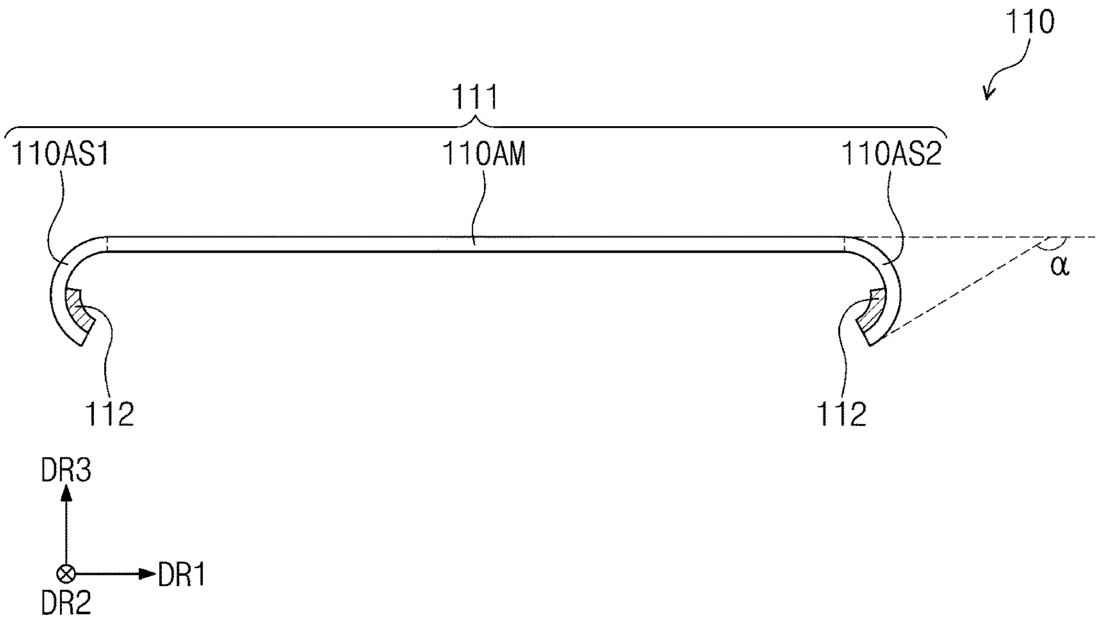
FIG. 5A and FIG. 5B are cross-sectional views of a window according to embodiments of the present inventive concept.
Figure 5B:
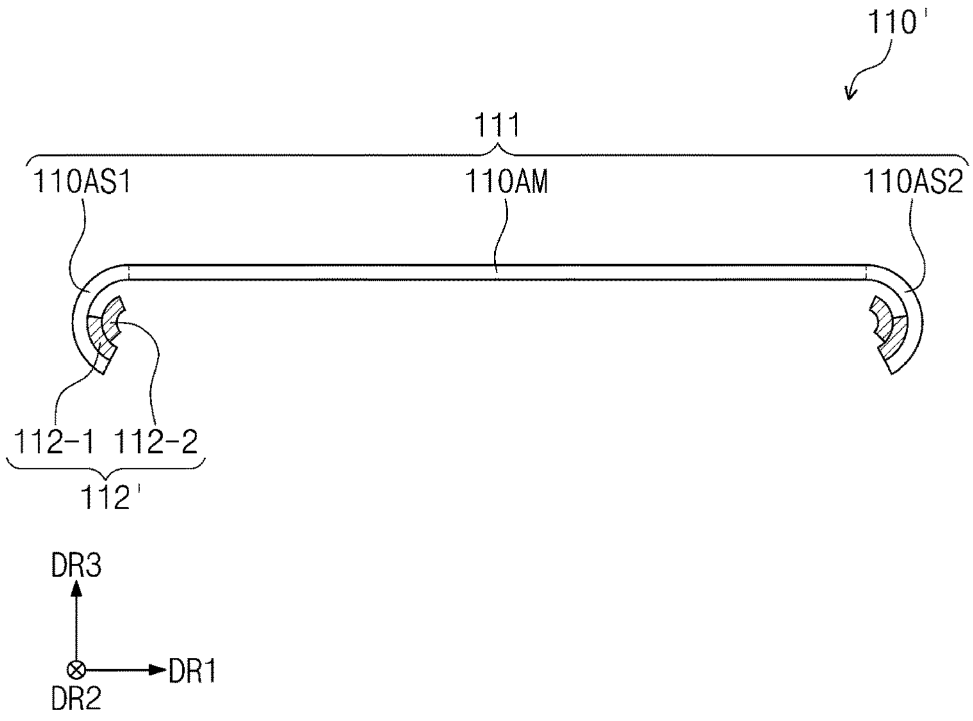

FIG. 5A is a cross-sectional view of a window according to an embodiment of the present inventive concept. FIG. 5B is a cross-sectional view of a window according to an embodiment of the present inventive concept. Hereinafter, referring to FIG. 5A and FIG. 5B, window 110 and 110' according to embodiments of the present inventive concept will be described in more detail.

Referring to FIG. 5A, the window 110 of an embodiment includes a window base portion 111, and a printing pattern 112 printed on the window base portion 111.

The window base portion 111 includes the above-described main transmissive portion 110AM, and the above-described side transmissive portions which are bent and extended from the main transmissive portion 110AM. The side transmissive portions include the first side transmissive portion 110AS1 and the second side transmissive portion 110AS2 which are respectively extended from each side of the main transmissive portion 110AM.

The main transmissive portion 110AM may be substantially parallel to a plane defined by the first direction DR1 and the second direction DR2. In an embodiment, the first and second side transmissive portions 110AS1 and 110AS2 may be bent at an angle in a range of about 90° or greater. For example, the bending angle (α) formed by ends of the first and second side transmissive portions 110AS1 and 110AS2 and a plane defined by the main transmissive portion 110AM may be an obtuse angle in a range of about 90° or greater. In an embodiment, each of the first side transmissive portion 110AS1 and the second side transmissive portion 110AS2 may bent at an obtuse angle of about 90° or greater with respect to the plane defined by the main transmissive portion 110AM. The bending angles formed by each of the first side transmissive portion 110AS1 and the second side transmissive portion 110AS2 with respect to the main transmissive portion 110AM may be the same, or different from each other. For example, in an embodiment, each of the first side transmissive portion 110AS1 and the second side transmissive portion 110AS2 may have an angle of about 120° or about 160° with respect to the main transmissive portion 110AM.

The printing pattern 112 is a colored layer, and may include a material that absorbs light. In an embodiment, the printing pattern 112 may include a colored organic substance or an opaque metal. For example, the printing pattern 112 may include a blue or black pigment. However, embodiments of the present inventive concept are not limited thereto. The non-display region 100AN (see FIG. 1) of the display device 100 (see FIG. 1) may be defined by the printing pattern 112.

The printing pattern 112 may be disposed at the outer periphery of the window base portion 111. For example, as shown in the embodiments of FIGS. 5A-5B, the printing pattern 112 or 112' may be disposed on the first and second side transmissive portions 110AS1 and 110AS2. The printing pattern 112 may be disposed to be aligned with the ends of the first and second side transmissive portions 110AS1 and 110AS2 which form ends of the window base portion 111. The printing pattern 112 may be disposed from the ends of the first and second side transmissive portions 110AS1 and 110AS2 to central portions of the first and second side transmissive portions 110AS1 and 110AS2. The printing pattern 112 may be disposed on each of the first and second side transmissive portions 110AS1 and 110AS2. In an embodiment, the printing pattern 112 may be printed on the first and second side transmissive portions 110AS1 and 110AS2 by a printing pad PRP (see FIG. 6A) to be described later.

Referring to FIG. 5B, in a window 110' of an embodiment of the present inventive concept, a printing pattern 112' may be provided as a plurality of layers. The printing pattern 112' may include a basic printing pattern 112-1 and an additional printing pattern 112-2 disposed on the basic printing pattern 112-1.

The basic printing pattern 112-1 may be disposed to be aligned with the ends of the first and second side transmissive portions 110AS1 and 110AS2 which form the ends of the window base portion 111. The basic printing pattern 112-1 may be disposed from the ends of the first and second side transmissive portions 110AS1 and 110AS2 to the central portions of the first and second side transmissive portions 110AS1 and 110AS2. The additional printing pattern 112-2 may be disposed in an area that is spaced apart from the ends of the first and second side transmissive portions 110AS1 and 110AS2 towards the inside by a predetermined interval. A portion of the additional printing pattern 112-2 overlaps the basic printing pattern 112-1, and the remaining portions thereof may be positioned towards the inside so as not to overlap the basic printing pattern 112-1. The basic printing pattern 112-1 may be printed on the first and second side transmissive portions 110AS1 and 110AS2 by the printing pad PRP (see FIG. 6A) to be described later. The additional printing pattern 112-2 may be printed on the basic printing pattern 112-1 by an additional printing pad PRP-a (see FIG. 8A) to be described later. The window 110' of an embodiment of the present inventive concept includes the printing pattern 112' having a double-layered structure, so that the printing pattern 112' may be formed on the first and second side transmissive portions 110AS1 and 110AS2 without any unprinted portions with respect to the window 110' having a large bending angle (α) in a range of about 150° or greater.

Figure 6A:
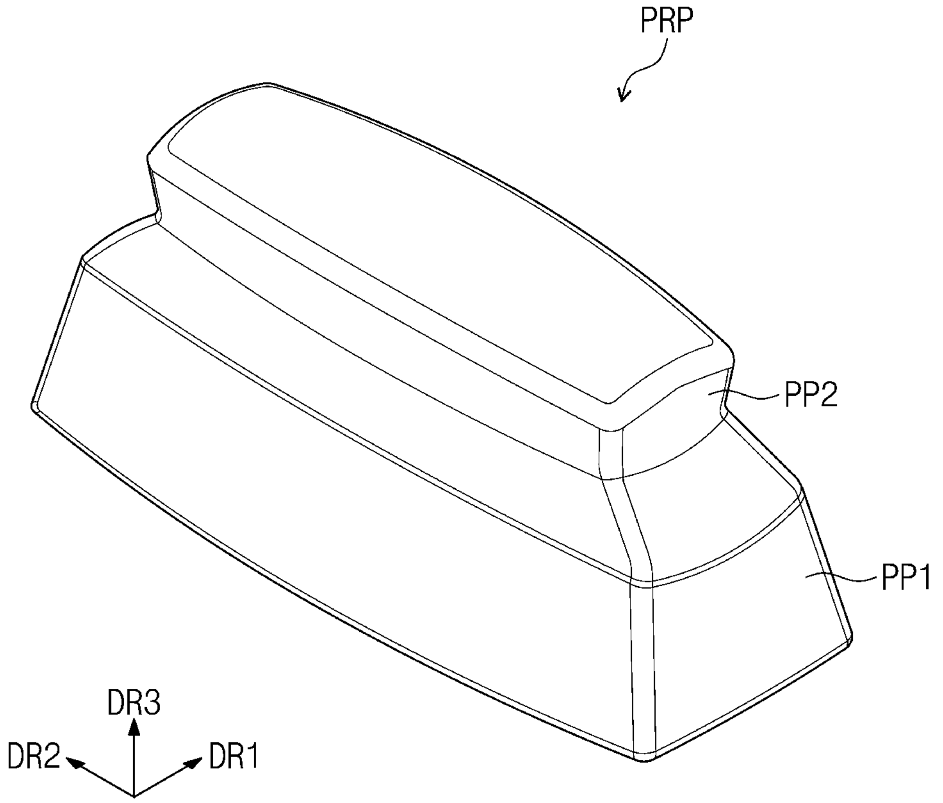
FIG. 6A is a perspective view of a printing pad according to an embodiment of the present inventive concept.
Figure 6B:
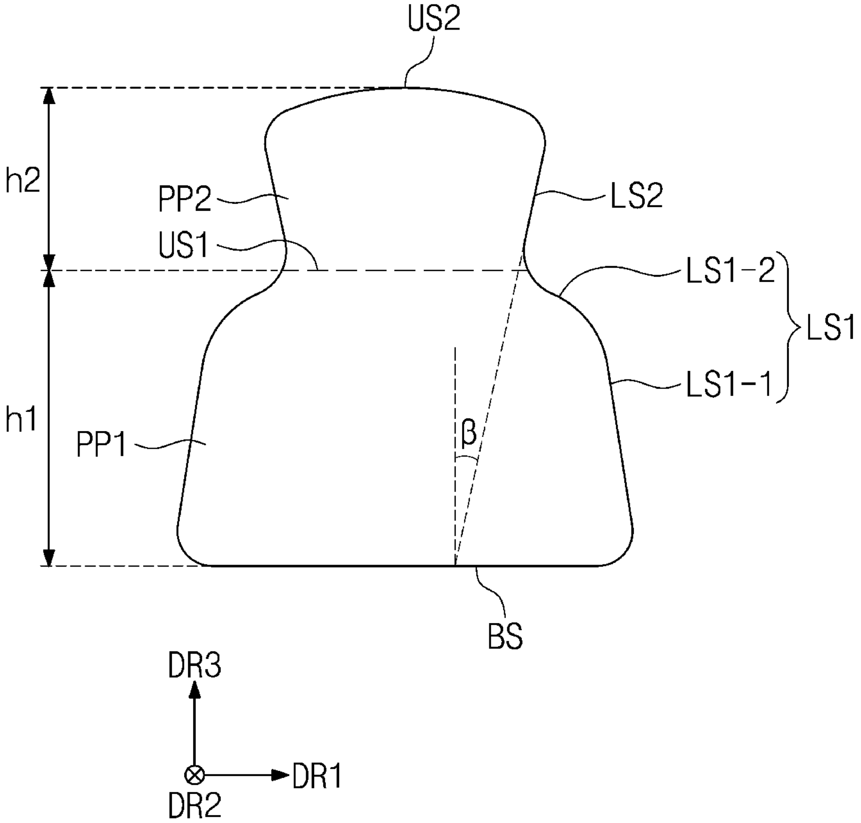
FIG. 6B is a cross-sectional view of a printing pad according to an embodiment of the present inventive concept.

FIG. 6A is a perspective view of a printing pad according to an embodiment of the present inventive concept. FIG. 6B is a cross-sectional view of a printing pad according to an embodiment of the present inventive concept.

Referring to FIG. 6A and FIG. 6B, the printing pad PRP according to an embodiment includes a first portion PP1 and a second portion PP2.

The first portion PP1 includes a bottom surface BS extending in a plane defined by the first direction DR1 and the second direction DR2, a first upper surface US1 facing the bottom surface BS, and a first side surface LS1 connecting the bottom surface BS and the first upper surface US1. The bottom surface BS may be a substantially flat surface. At least a portion of the first side surface LS1 may be curved. For example, the first side surface LS1 may be a naturally curved surface within the range of maintaining the shape of the printing pad PRP. The first upper surface US1 may be an inner surface on which the second portion PP2 is disposed. The first side surface LS1 may include a first sub-side surface LS1-1 having a relatively steeper slope and a second sub-side surface LS1-2 having a relatively gentler slope. The first sub-side surface LS1-1 extends from the bottom surface BS, and the second sub-side surface LS1-2 may be positioned closer to the first upper surface US1 than the first sub-side surface LS1-1. For example, in an embodiment, the second sub-side surface LS1-2 may be directly connected to the first upper surface US1.

The first portion PP1 may be a portion having a width (e.g., length in the first direction DR1) that decreases in an upward direction (e.g., in a direction towards the second portion PP2). For example, the first portion PP1 may be a portion having a width (e.g., length in the first direction DR1) that decreases from the bottom surface BS towards the first upper surface US1. In an embodiment, the first portion PP1 may be a portion having a taper angle in a range of about 90° or less. In an embodiment, the angle formed by the first side surface LS1 of the first portion PP1 with respect to the bottom surface BS may be in a range of about 90° or less.

The second portion PP2 is disposed on the first portion PP1 (e.g., directly thereon in the third direction DR3). The second portion PP2 has an integral shape with the first portion PP1, and may be extended in an upward direction of the first portion PP1 (e.g., in a direction away from the first portion PP1). The second portion PP2 may have a shape protruding in the third direction DR3 intersecting the first direction DR1 and the second direction DR2 away from the first upper surface US1 of the first portion PP1.

The first portion PP1 and the second portion PP2 may be distinguished based on a boundary point at which a slope is sharply changed. For example, on the second sub-side surface LS1-2 of the first portion PP1, the first portion PP1 and the second portion PP2 may be distinguished based on a boundary point at which a slope is sharply changed with respect to a second side surface LS2. A plane (e.g., a plane defined in the first and second directions DR1, DR2) of a boundary between the first portion PP1 and the second portion PP2 may be the first upper surface US1.

The second portion PP2 includes a second upper surface US2 facing the first upper surface US1, and the second side surface LS2 connecting the second upper surface US2 and the first upper surface US1. As shown in the embodiments of FIGS. 6A and 6B, the second upper surface US2 may be a curved surface. For example, the second upper surface US2 may have a shape convexly protruding in the third direction DR3 (e.g., in a direction away from the first portion PP1). The second side surface LS2 may be a surface having a slope that is sharply changed and extended from the second sub-side surface LS1-2. The second side surface LS2 may be a portion onto which ink is transferred in a window manufacturing method to be described later. At least a portion of the second side surface LS2 may be curved. In an embodiment, the second upper surface US2 and the second side surface LS2 may be naturally curved surfaces within the range of maintaining the shape of the printing pad PRP.

In an embodiment, a planar area of the bottom surface BS of the first portion PP1 (e.g., area in a plane defined in the first and second directions DR1, DR2) may be greater than a planar area of the first upper surface US1 (e.g., area in a plane defined in the first and second directions DR1, DR2). The planar area of the second upper surface US2 (e.g., area in a plane defined in the first and second directions DR1, DR2) may be greater than the planar area of the first upper surface US1.

The second portion PP2 is a portion having a width (e.g., length in the first direction DR1) that increases in an upward direction. For example, the second portion PP2 is a portion having a width (e.g., length in the first direction DR1) that increases from the first upper surface US1 towards the second upper surface US2 (e.g., in the third direction DR3). In an embodiment, the second portion PP2 may be a portion having a taper angle of greater than about 90°. The angle formed by the second side surface LS2 of the second portion PP2 with respect to the bottom surface BS may be greater than about 90°.

An angle (β) formed by the second side surface LS2 of the second portion PP2 with respect to a base line perpendicular to the bottom surface BS (e.g., extending in the third direction DR3) may be in a range of about 10° to about 12. In an embodiment, the angle (β) formed by the second side surface LS2 with respect to the base line perpendicular to the bottom surface BS may be about 10°. In an embodiment in which the angle (β) formed by the second side surface LS2 with respect to the base line perpendicular to the bottom surface BS is less than about 10°, when the printing pattern 112 (see FIG. 5A) is formed on the first and second side transmissive portions 110AS1 and 110AS2 (see FIG. 5A) of the window 110 (see FIG. 5A) through the printing pad PRP, there may be unprinted portions at the ends of the first and second side transmissive portions 110AS1 and 110AS2. In an embodiment in which the angle (β) formed by the second side surface LS2 with respect to the base line perpendicular to the bottom surface BS is greater than about 12°, the printing pad PRP may be damaged during removing the printing pad PRP from a mold PM (see FIG. 9A) in a process of forming the printing pad PRP.

A printing pad PRP according to an embodiment of the present inventive concept includes a second portion PP2 having a width (e.g., length in the first direction DR1) that increases in an upward direction, such as from the first upper surface US1 towards the second upper surface US2 in the third direction DR3. For example, the second portion PP2 may have a taper angle of greater than about 90°, and a second side surface LS2 of the second portion PP2 may be a portion onto which ink is transferred in a window manufacturing method. The printing pad PRP according to an embodiment prints a printing pattern on a target window through the second side surface LS2 of the second portion PP2 having an inverse taper shape with a taper angle of greater than about 90°, so that the printing pattern may be printed on a window side transmissive portion having a bending angle of about 90° or greater.

Comparative printing pads do not include a printing portion having a taper angle of greater than about 90, so that when a printing pattern is printed on a window side transmissive portion having a bending angle of about 90° or greater, there may be defects such as damages caused by the interference with the side transmissive portion, or unprinted portions at an end of the side transmissive portion due to insufficient expansion of the printing pad. The printing pad according to an embodiment of the present inventive concept prints a printing pattern on a side transmissive portion of a target window through the second side surface of the second portion having a taper angle of greater than about 90°, so that the interference with the side transmissive portion may be minimized, and the printing pattern may be clearly printed without any unprinted portions at an end of the side transmissive portion. Accordingly, the reliability of a process of printing a printing pattern on a window may be increased, and the defect rate of a window manufactured through the printing pad may be decreased.

In an embodiment, each of the first portion PP1 and the second portion PP2 may include at least one material selected from rubber and silicone. For example, each of the first portion PP1 and the second portion PP2 may include cured silicone. However, embodiments of the present inventive concept are not limited thereto.

In an embodiment, the first portion PP1 and the second portion PP2 may include the same material. The first portion PP1 and the second portion PP2 may be formed in an integrated process through silicone having the same hardness. However embodiments of the present inventive concept are not limited thereto. For example, in some embodiments, the first portion PP1 and the second portion PP2 may include different materials from each other. In some embodiments, the first portion PP1 and the second portion PP2 may be formed of silicone having different hardnesses from each other through separate processes.

In an embodiment, the first portion PP1 and the second portion PP2 may include materials having different hardnesses from each other. The first portion PP1 and the second portion PP2 may include silicone having different hardnesses from each other. In an embodiment, the hardness of the first portion PP1 may be in a range of about 20 sh A to about 35 sh A. For example, the hardness of the first portion PP1 may be in a range of about 25 sh A to about 30 sh A. The hardness of the second portion PP2 may be in a range of about 7 sh A to about 15 sh A. The hardness of the second portion PP2 may be about 10 sh A to about 12 sh A. As the second portion PP2 has a lower hardness than the first portion PP1, the expansion rate of the second portion PP2 may be larger than the expansion rate of the first portion PP1 in a process of printing the printing pattern 112 on the window 110 (see FIG. 5A) through the printing pad PRP. Since the expansion rate of the second portion PP2 which substantially prints the printing pattern 112 is large, the printing pad PRP of an embodiment of the present inventive concept may accurately print the printing pattern 112 to the ends of the bent first and second side transmissive portions 110AS1 and 110AS2.

In an embodiment, the first portion PP1 and the second portion PP2 may have the same or different heights (e.g., length in the third direction DR3). The first portion PP1 may have the same height as the second portion PP2, or a first height h1 of the first portion PP1 may be larger than a second height h2 of the second portion PP2. In an embodiment, the ratio of the first height h1 to the second height h2 may be in a range of about 5:5 to about 7:3.

FIG. 7A to FIG. 7E are cross-sectional views sequentially showing a method for manufacturing a window through a printing pad according to embodiments of the present inventive concept. Hereinafter, in describing a method for manufacturing a window according to embodiments of the present inventive concept with reference to FIG. 7A to FIG. 7E, the same reference numerals are given to elements which are the same as those described above and detailed descriptions thereof will be omitted for convenience of explanation.

Figure 7A:
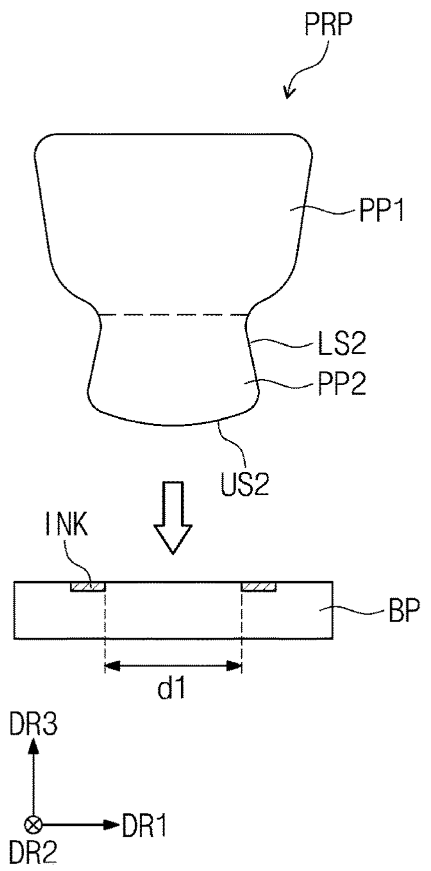
FIG. 7A to FIG. 7E are cross-sectional views sequentially showing a method for manufacturing a window through a printing pad according to embodiments of the present inventive concept.
Figure 7B:
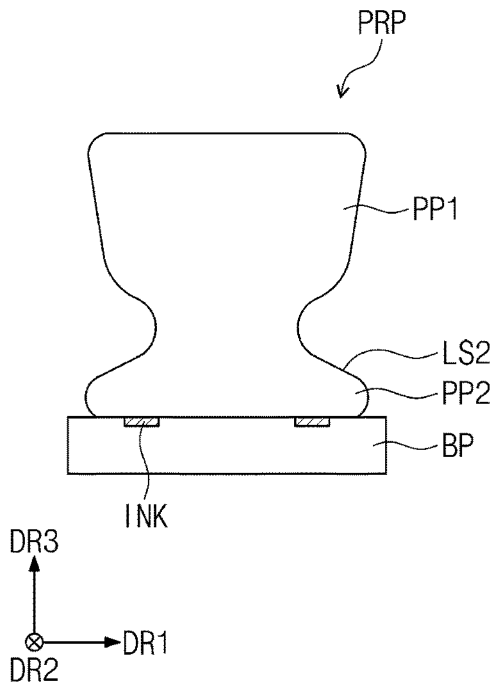
Figure 7C:
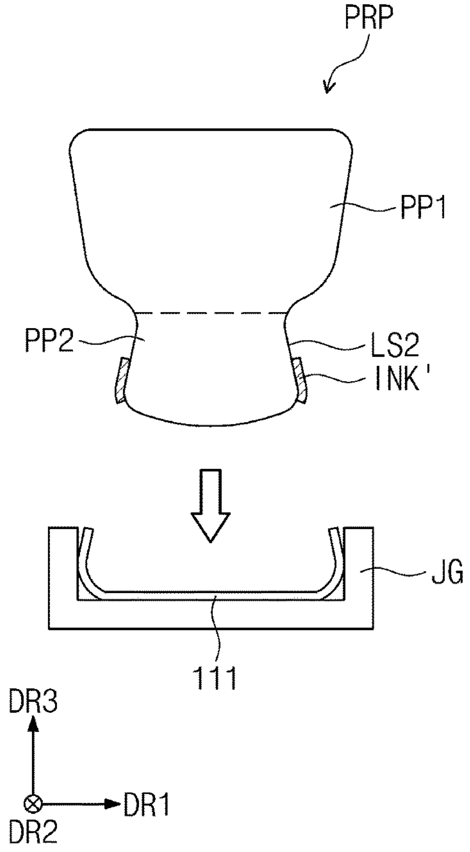

Referring to FIG. 7A to FIG. 7C, a window manufacturing method according to an embodiment includes adhering ink INK to the printing pad PRP. In an embodiment, the ink INK is disposed and provided on a printing plate BP. The printing pad PRP may be pressurized against (e.g., pressurized directly thereon) a printing plate BP to transfer the ink INK onto the printing pad PRP from the printing plate BP. The ink INK transferred and adhered to the printing pad PRP may be adhered to the second side surface LS2 in the second portion PP2 of the printing pad PRP.

In an embodiment, the ink INK may be provided as a plurality of patterns spaced apart at a first interval d1 (e.g., length in the first direction DR1). The first interval d1 may be set to a predetermined value such that the ink INK is printed on the window 110 (see FIG. 5A) by the printing pad PRP to form the printing pattern 112 (see FIG. 5A).

Figure 7D:
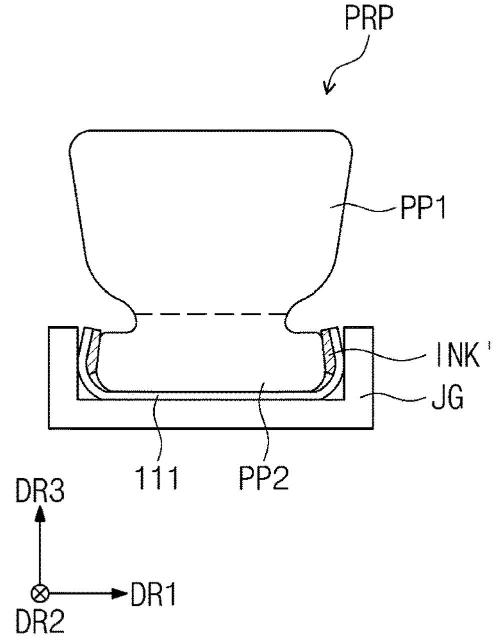
Figure 7E:
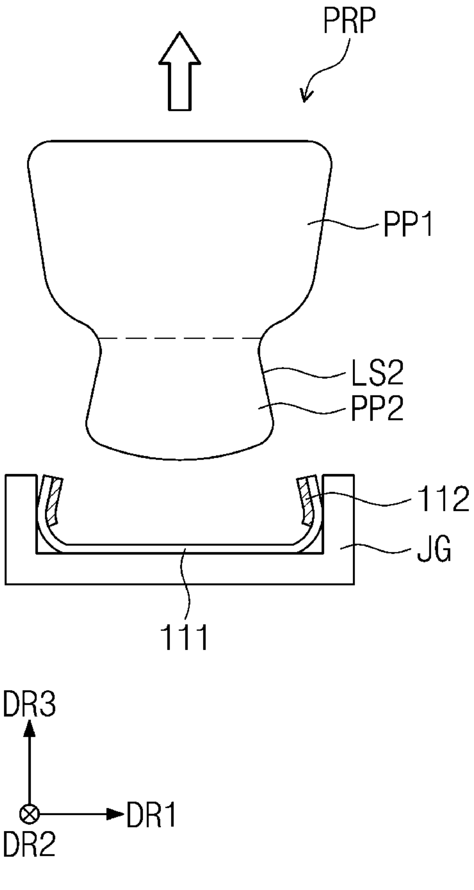

Referring to FIG. 7C to FIG. 7E, the window manufacturing method according to an embodiment includes pressurizing the printing pad PRP to which an ink INK' is adhered on the window base portion 111, to provide the printing pattern 112 to the window base portion 111. For example, the ink INK' may be a portion of the ink INK shown in FIG. 7B that is transferred and adhered to the printing pad PRP after pressurizing the printing pad PRP against the printing plate BP. The ink INK' may be provided to the window base portion 111 while being adhered to the second side surface LS2.

The window base portion 111 may include the first and second side transmissive portions 110AS1 and 110AS2 (see FIG. 5A) which are bent at an angle of about 90° or greater. As shown in the embodiment of FIG. 7B, the window base portion 111 may be provided while being disposed inside a printing jig JG. The printing jig JG may include a bottom portion and a sidewall portion extended in the third direction DR3 from the bottom portion. In an embodiment, at least a portion of the first and second side transmissive portions 110AS1 and 110AS2 of the window base portion 111 may be disposed to come into direct contact with the sidewall portion of the printing jig JG.

The printing pad PRP to which the ink INK' is adhered may be pressed against the window base portion 111 disposed in the printing jig JG, so that the ink INK' may be transferred onto the window base portion 111, such as the ends of the first and second side transmissive portions 110AS1 and 110AS2 which form ends of the window base portion 111. The shape of the second portion PP2 to which the ink INK' is adhered may be changed by the pressure applied from an upper portion of the printing pad PRP, such as the first portion PP1. For example, as shown in the embodiment of FIG. 7D, the second portion PP2 may be expanded in the first direction DR1 and in a direction opposite thereto by pressure, so that the ink INK' may be transferred onto the first and second side transmissive portions 110AS1 and 110AS2 of the window base portion 111. Thereafter, the transferred ink INK' forms the printing pattern 112, and the printing pad PRP may be moved in an upward direction and removed. As the printing pattern 112 is formed, the window 110 (see FIG. 5A) having the printing pattern 112 may be formed.

In the window manufacturing method according to an embodiment of the present inventive concept, a printing pattern is printed on a window base portion through a printing pad including a second portion having a taper angle of greater than about 90°, so that the printing pattern may be formed on a window having a bending angle of about 90° or greater. In the window manufacturing method according to an embodiment of the present inventive concept, a printing pattern is printed on a side transmissive portion of a window base portion through a second side surface of the second portion having a taper angle of greater than about 90°, so that the interference with the side transmissive portion may be minimized, and the printing pattern may be printed without any unprinted portions at an end of the side transmissive portion. Accordingly, the reliability of a process of printing a printing pattern on a window may be increased, and the defect rate of a window manufactured through the printing pad may be decreased.

FIG. 8A to FIG. 8E are cross-sectional views sequentially showing a method for manufacturing a window through an additional printing pad according to embodiments of the present inventive concept. FIG. 8A to FIG. 8E are cross-sectional views sequentially showing a process of forming the additional printing pattern 112-2 in the window 110' illustrated in FIG. 5B. In the window 110' of FIG. 5B, the basic printing pattern 112-1 may be formed through a process illustrated in FIG. 7A to FIG. 7E. For example, the printing pattern 112 shown in the embodiment of FIG. 7E may be the basic printing pattern 112-1. Hereinafter, forming the additional printing pattern 112-2 through the process illustrated in FIG. 8A to FIG. 8E after the basic printing pattern 112-1 is formed through the process illustrated in FIG. 7A to FIG. 7E, will be described.

Referring to FIG. 8A to FIG. 8E, in the window manufacturing method according to an embodiment, the additional printing pattern 112-2 may be printed by the additional printing pad PRP-a.

Figure 8A:
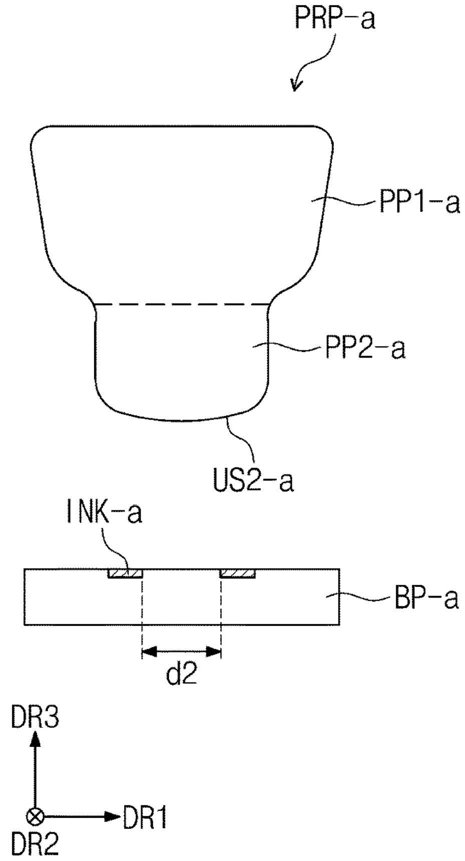
FIG. 8A to FIG. 8E are cross-sectional views sequentially showing a method for manufacturing a window through an additional printing pad according to embodiments of the present inventive concept.

The additional printing pad PRP-a may include a third portion PP1-*a* and a fourth portion PP2-*a*. In an embodiment, the third portion PP1-*a* may include a shape similar to the shape of the first portion PP1 of the printing pad PRP (see FIG. 6B). As shown in FIG. 8A, the fourth portion PP2-*a* may be disposed on an upper portion of the third portion PP1-*a*. The fourth portion PP2-*a* may have a shape that extends to the upper portion of the third portion PP1-*a*. The fourth portion PP2-*a* may have a shape protruding in the third direction DR3 from the third portion PP1-*a*. In an embodiment, the width of the fourth portion PP2-*a* (e.g., length in the first direction DR1) may remain the same as it moves away from the third portion PP1-*a* (e.g., as a distance of the fourth portion PP2-*a* from the third portion PP1-*a* increases in the third direction DR3). However, embodiments of the present inventive concept are not limited thereto. For example, in an embodiment, the width of the fourth portion PP2-*a* (e.g., length in the first direction DR1) may decrease as it moves way from the third portion PP1-*a* (e.g., as a distance of the fourth portion PP2-*a* from the third portion PP1-*a* increases in the third direction DR3). For example, unlike the second portion PP2 of the printing pad PRP, the fourth portion PP2-*a* may have a shape with a taper angle of about 90° or less. The fourth portion PP2-*a* may include an additional upper surface US2-*a* having a convexly protruding shape in the third direction DR3.

Figure 8B:
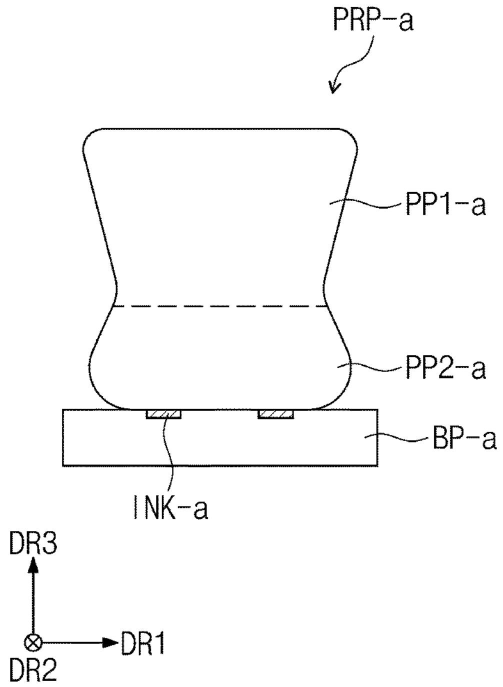
Figure 8C:
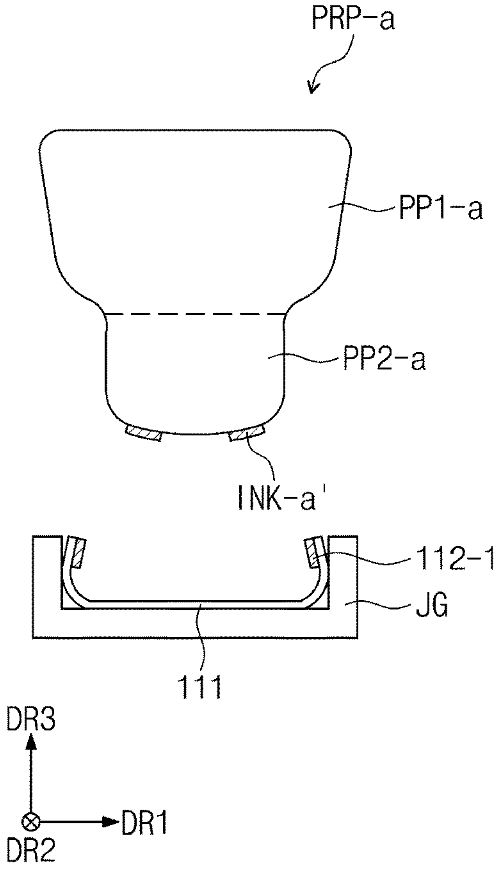

Referring to FIG. 8A to FIG. 8C, the window manufacturing method according to embodiments of the present inventive concept may include adhering an additional ink INK-a to the additional printing pad PRP-a. The additional ink INK-a is disposed and provided on an additional printing plate BP-a. The additional printing pad PRP-a may be pressurized against the additional printing plate BP-a, to transfer the additional ink INK-a onto the additional printing pad PRP-a from the additional printing plate BP-a. The additional ink INK-a transferred and adhered to the additional printing pad PRP-a may be adhered securely to the additional upper surface US2-*a* in the fourth portion PP2-*a* of the additional printing pad PRP-a.

As shown in the embodiment of FIG. 8A, the additional ink INK-a may be provided as a plurality of patterns spaced apart at a second interval d2 (e.g., length in the first direction DR1). The second interval d2 may be set to a predetermined value such that the additional ink INK-a is printed on the window 110' (see FIG. 5B) by the additional printing pad PRP-a to form the additional printing pattern 112-2 (see FIG. 5B). In an embodiment, the second interval d2 may have a smaller value than the first interval d1 (see FIG. 7A). As the second interval d2 has a smaller value than the first interval d1, the additional printing pattern 112-2 may be disposed more towards the inside of the window base portion 111 compared to the basic printing pattern 112-1. For example, only a portion of the additional printing pattern 112-2 may overlap the basic printing pattern 112-1.

Figure 8D:
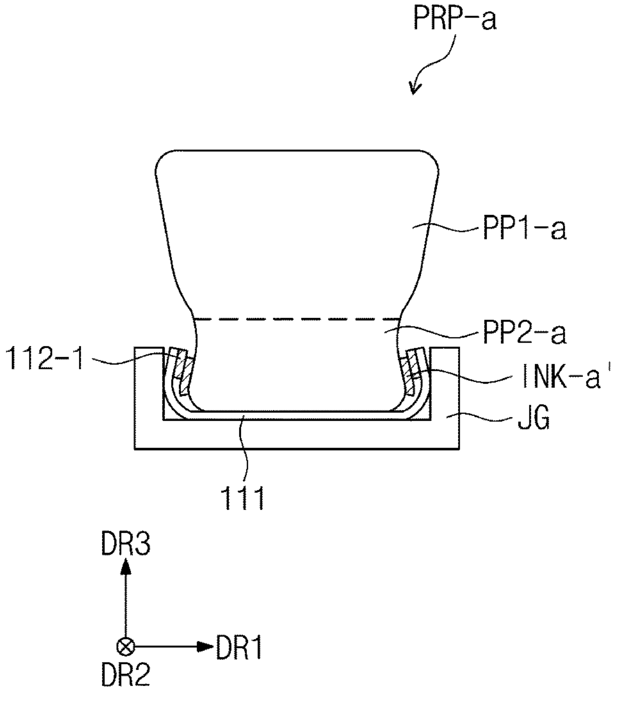
Figure 8E:
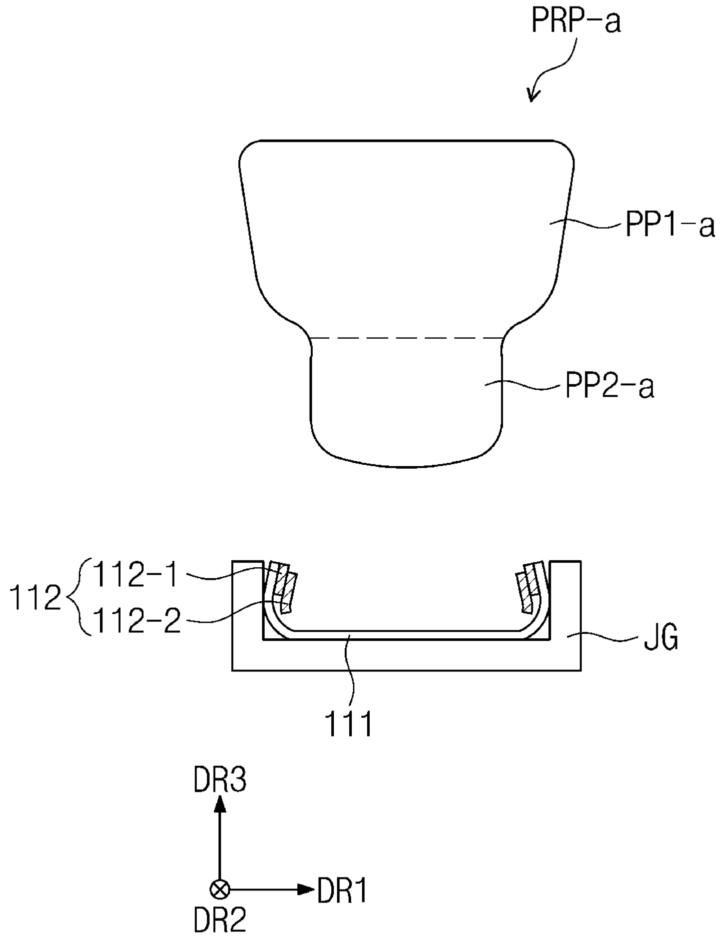

Referring to FIG. 8C to FIG. 8E, the window manufacturing method according to embodiments of the present inventive concept includes pressurizing the additional printing pad PRP-a to which an additional ink INK-a' is adhered, to provide the additional printing pattern 112-2 to the window base portion 111. The additional ink INK-a' may be provided to the window base portion 111 while being adhered to the additional upper surface US2-*a*.

The additional ink INK-a' may be transferred onto an upper portion of the basic printing pattern 112-1 which has been printed on the window base portion 111 from the additional printing pad PRP-a. The window base portion 111 may be disposed inside the printing jig JG. When the additional printing pad PRP-a is pressurized, the fourth portion PP2-*a* is expanded by applied pressure, so that the additional ink INK-a' adhered to the additional upper surface US2-*a* may be transferred onto the upper portion of the basic printing pattern 112-1. Thereafter, the transferred additional ink INK-a' forms the additional printing pattern 112-2, and the additional printing pad PRP-a may be moved in an upward direction and removed. As the additional printing pattern 112-2 is formed, the window 110' (see FIG. 5B) having the printing pattern 112' (see FIG. 5B) with a double-layered structure may be formed.

FIG. 9A to FIG. 9D are cross-sectional views sequentially showing a method for manufacturing a printing pad according to embodiments of the present inventive concept. Hereinafter, in describing a method for manufacturing the printing pad PRP according to embodiments of the present inventive concept with reference to FIG. 9A to FIG. 9D, the same reference numerals are given to elements which are the same as those described above and detailed descriptions thereof will be omitted for convenience of explanation.

Figure 9A:
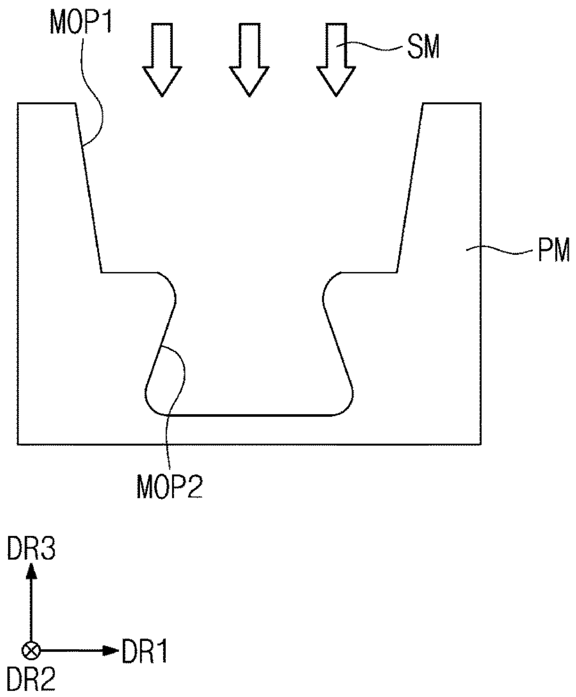
FIG. 9A to FIG. 9D are cross-sectional views sequentially showing a method for manufacturing a printing pad according to embodiments of the present inventive concept.
Figure 9B:
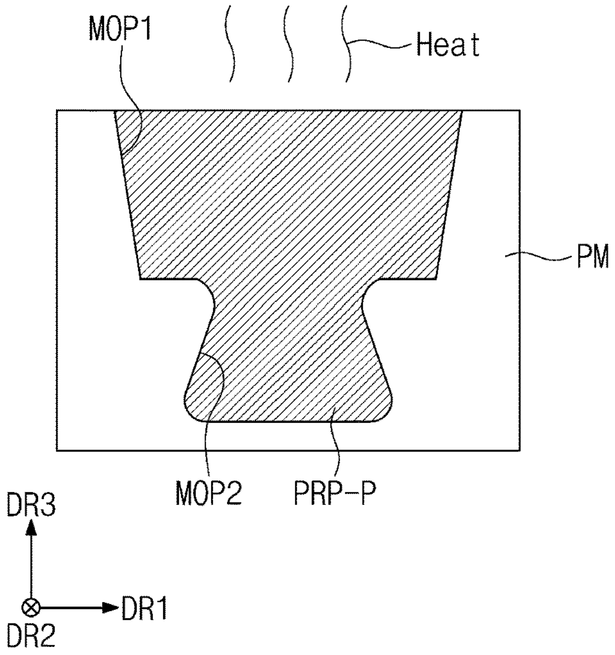
Figure 9C:
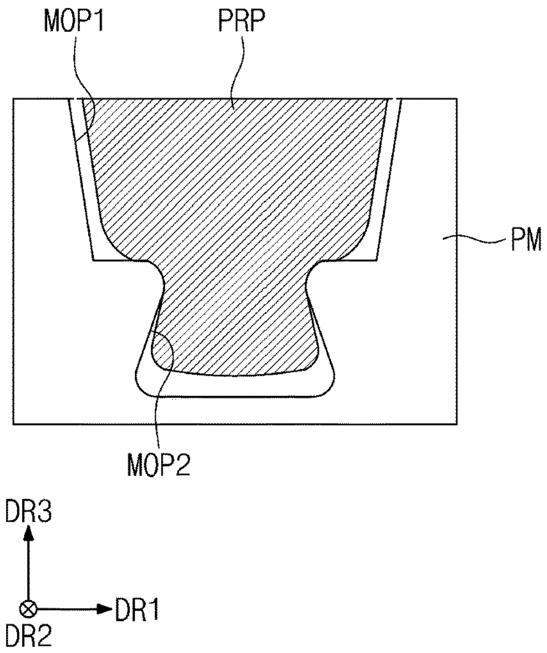
Figure 9D:
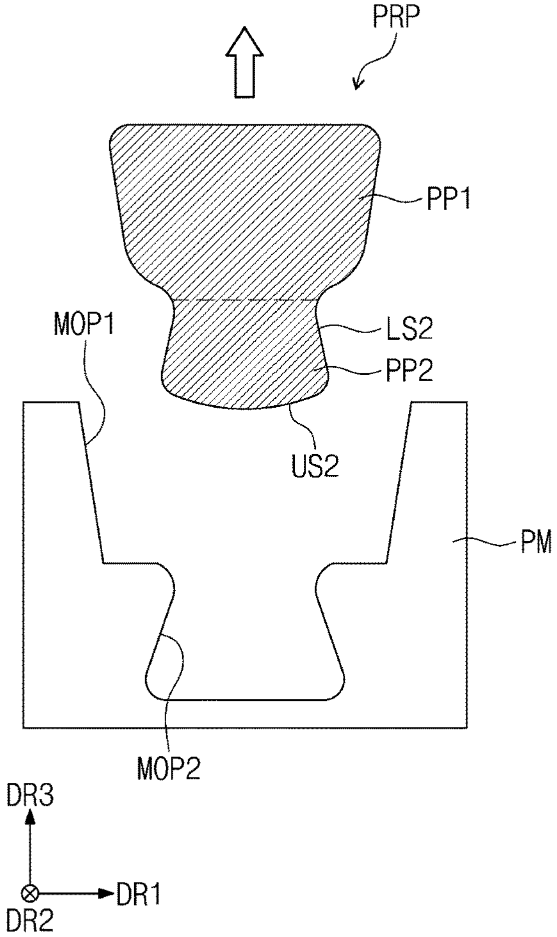

Referring to FIG. 6B, FIG. 9A, and FIG. 9B together, the method for manufacturing the printing pad PRP according to an embodiment may include providing a mold PM having a first opening MOP1 and a second opening MOP2 and providing an elastic material SM into the first opening MOP1 and the second opening MOP2 defined in the mold PM.

The first opening MOP1 may have a shape corresponding to the first portion PP1 of the printing pad PRP. The second opening MOP2 may have a shape corresponding to the second portion PP2 of the printing pad PRP. For example, the first opening MOP1 may have a shape having a width (e.g., length in the first direction DR1) that decreases with an increasing distance from an inlet side of the mold PM, and the second opening MOP2 may have a shape having a width (e.g., length in the first direction DR1) that increases with increasing distance from the inlet side of the mold PM. A first width of the first opening MOP1 (e.g., length in the first direction DR1) may be larger than a second width which is the width of the second opening MOP2 (e.g., length in the first direction DR1).

The elastic material SM may be provided to fill both the first opening MOP1 and the second opening MOP2. In an embodiment, the elastic material SM may include rubber or silicone. The elastic material SM provided inside the first opening MOP1 and the second opening MOP2 may be referred to as a preliminary printing pad PRP-P.

Referring to FIG. 6B and FIG. 9B to FIG. 9D together, the method for manufacturing the printing pad PRP according to an embodiment may include drying the preliminary printing pad PRP-P provided inside the first opening MOP1 and the second opening MOP2. In an embodiment, the preliminary printing pad PRP-P may be dried with heat. The preliminary printing pad PRP-P may be dried with heat to form the printing pad PRP shown in FIG. 9C. In a process of drying the preliminary printing pad PRP-P, the volume thereof may be reduced, so that the printing pad PRP may be separated from a sidewall defining the first opening MOP1 and the second opening MOP2. Thereafter, the printing pad PRP may be removed from the mold PM. The printing pad PRP formed using the mold PM according to an embodiment may include the first portion PP1 corresponding to the shape of the first opening MOP1 and the second portion PP2 corresponding to the shape of the second opening MOP2.

FIG. 10A to FIG. 10F are cross-sectional views sequentially showing a method for manufacturing a printing pad according to an embodiment of the present inventive concept. Hereinafter, in describing the method for manufacturing the printing pad PRP according to an embodiment of the present inventive concept with reference to FIG. 10A to FIG. 10F, the same reference numerals are given to elements which are the same as those described above and detailed descriptions thereof will be omitted for convenience of explanation.

Referring to FIG. 6B and FIG. 10A to FIG. 10F, the method for manufacturing the printing pad PRP according to an embodiment may include forming the second portion PP2 through a first elastic material SM1 and forming the first portion PP1 through a second elastic material SM2. That is, the first portion PP1 and the second portion PP2 may be formed through different materials from each other in different processes from each other.

The first elastic material SM1 and the second elastic material SM2 may be different materials from each other. In an embodiment, the first elastic material SM1 and the second elastic material SM2 may be silicone having different hardnesses from each other. For example, in an embodiment, the first elastic material SM1 may be silicone having a hardness in a range of about 7 sh A to about 15 sh A. The first elastic material SM1 may be silicone having a hardness in a range of about 10 sh A to about 12 sh A. The second elastic material SM2 may be silicone having a hardness in a range of about 20 sh A to about 35 sh A. The second elastic material SM2 may be silicone having a hardness in a range of about 25 sh A to about 30 sh A.

Figure 10A:
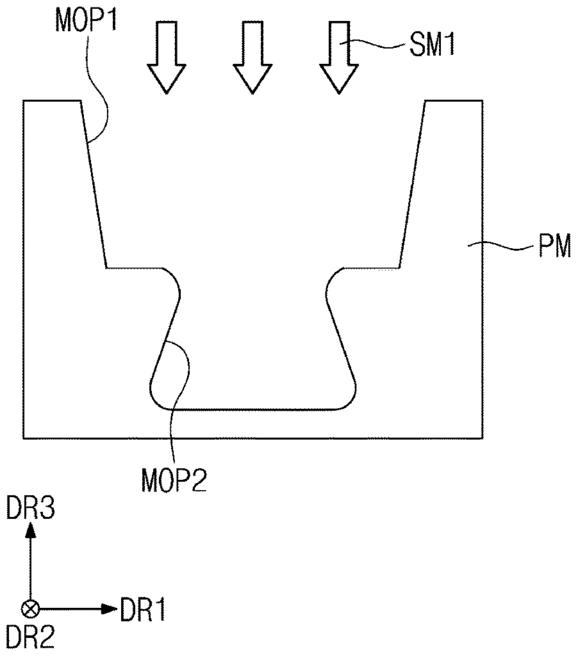
FIG. 10A to FIG. 10F are cross-sectional views sequentially showing a method for manufacturing a printing pad according to embodiments of the present inventive concept.
Figure 10B:
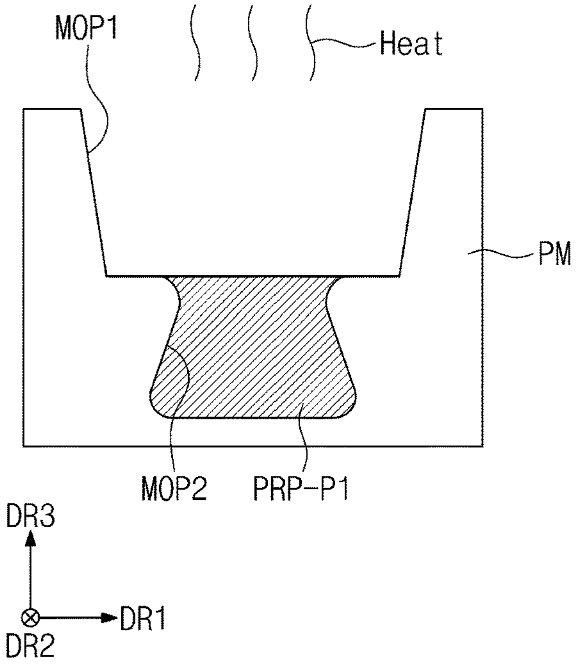

Referring to FIG. 6B, FIG. 10A, and FIG. 10B together, the method for manufacturing the printing pad PRP according an embodiment may include providing the first elastic material SM1 into the second opening MOP2. The first elastic material SM1 may be provided to fill the inside of the second opening MOP2. In an embodiment, the first elastic material SM1 may fill only the second opening MOP2, and may not be provided inside the first opening MOP1. The first elastic material SM1 provided inside the second opening MOP2 may be referred to as a first preliminary pattern PRP-P1.

Figure 10C:
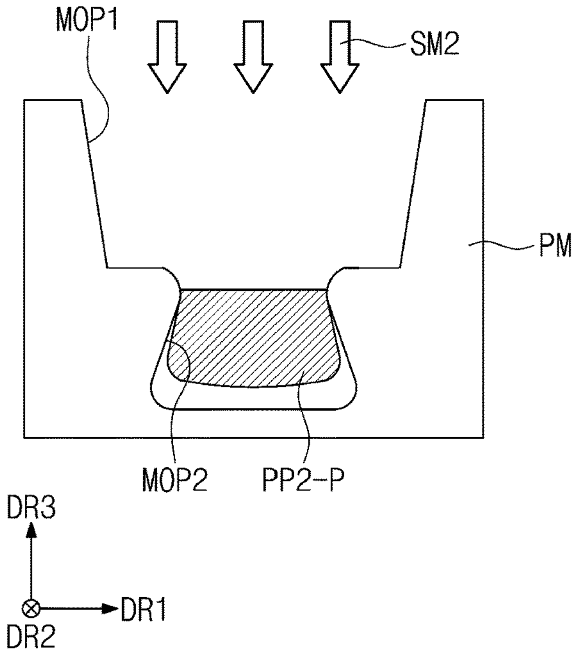

Referring to FIG. 6B, FIG. 10B, and FIG. 10C together, the method for manufacturing the printing pad PRP according an embodiment may include drying the first preliminary pattern PRP-P1 provided inside the second opening MOP2. In an embodiment, the first preliminary pattern PRP-P1 may be dried with heat. As shown in FIGS. 10B-10C, the first preliminary pattern PRP-P1 may be dried with heat to form a second preliminary portion PP2-P. In a process of drying the first preliminary pattern PRP-P1, the volume thereof may be reduced, so that the second preliminary portion PP2-P may be separated from the sidewall defining the second opening MOP2.

Figure 10D:
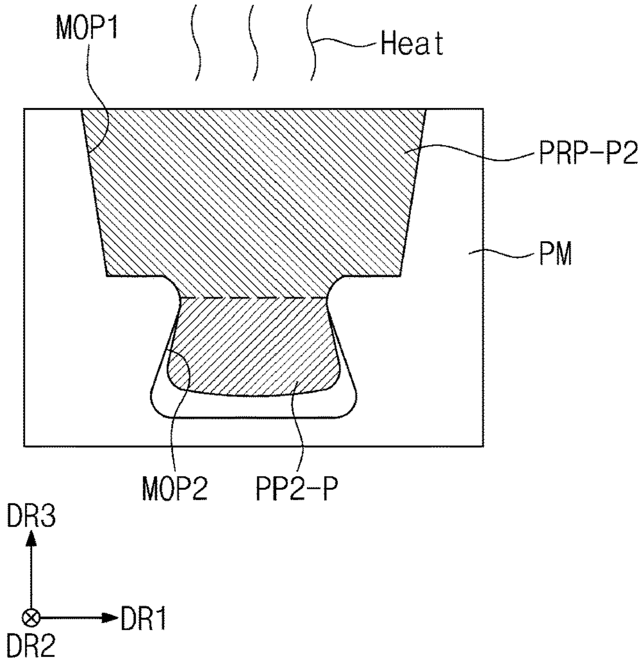
Figure 10E:
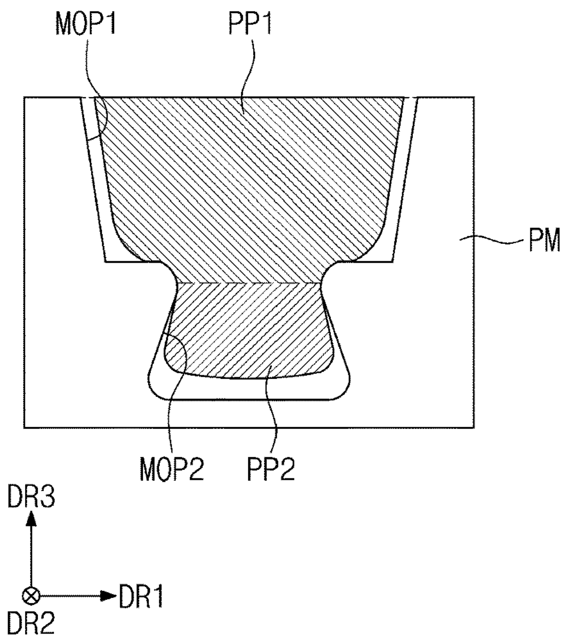
Figure 10F:
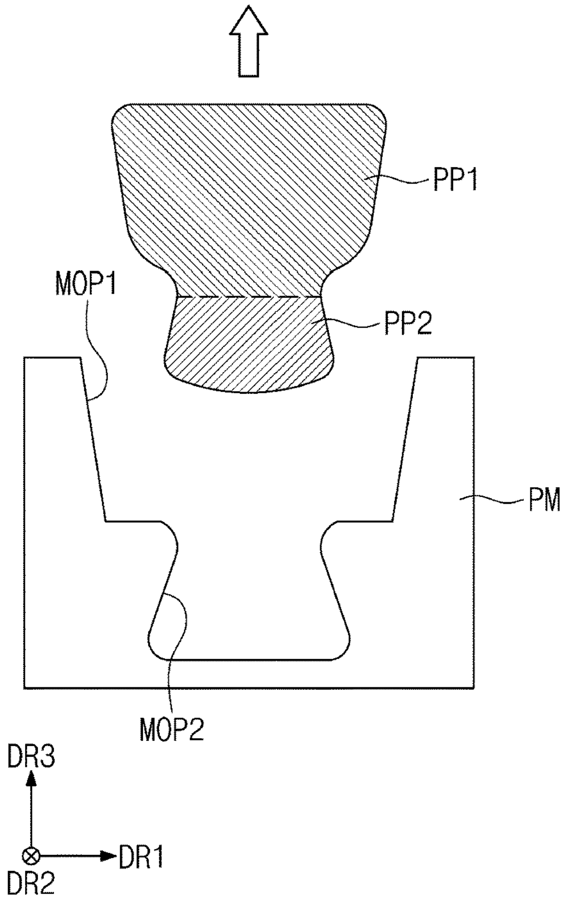

Referring to FIG. 6B, FIG. 10C, and FIG. 10D together, the method for manufacturing the printing pad PRP according an embodiment may include providing the second elastic material SM2 into the first opening MOP1. The second elastic material SM2 may be provided to fill the inside of the first opening MOP1. The second elastic material SM2 may be provided on the second preliminary portion PP2-P disposed in the second opening MOP2 to fill the first opening MOP1. For example, the second elastic material SM2 may directly contact an upper portion of the second preliminary portion PP2-P inside the second opening MOP2. The second elastic material SM2 provided inside the first opening MOP1 may be referred to as a second preliminary pattern PRP-P2.

Referring to FIG. 6B and FIG. 10D to FIG. 10F together, the method for manufacturing the printing pad PRP according an embodiment may include drying the second preliminary pattern PRP-P2 provided inside the first opening MOP1. In an embodiment, the second preliminary pattern PRP-P2 may be dried with heat. The second preliminary pattern PRP-P2 may be dried with heat to form the first portion PP1. The first portion PP1 formed as the second preliminary pattern PRP-P2 that is dried with heat may be bonded to the second portion PP2 disposed therebelow to form the printing pad PRP. In a process of drying the second preliminary pattern PRP-P2, the volume thereof may be reduced, so that the first portion PP1 may be separated from the sidewall defining the first opening MOP1. Thereafter, the printing pad PRP may be removed from the mold PM. The printing pad PRP formed using the mold PM according to an embodiment of the present inventive concept may include the first portion PP1 corresponding to the shape of the first opening MOP1 and the second portion PP2 corresponding to the shape of the second opening MOP2. Since the second elastic material SM2 forming the first portion PP1 and the first elastic material SM1 forming the second portion PP2 are different, the properties of the first portion PP1 and the properties of the second portion PP2 may be different. For example, the first portion PP1 and the second portion PP2 may having hardnesses that are different from each other. In an embodiment, since the hardness of the second portion PP2 is less than the hardness of the first portion PP1, the expansion rate of the second portion PP2 may be relatively large in a process of printing a printing pattern through the printing pad PRP, and accordingly, the printing pattern may be accurately printed to an end of a window having a bent side transmissive portion.

According to an embodiment of the present inventive concept, a printing pattern may be formed on a side portion of a window in which the side portion bent at an angle of about 90° or greater, and a printing pad transferring the printing pattern is prevented from being damaged, so that the reliability of a process of printing a printing pattern on a window may be increased, and the defect rate of a window manufactured through the printing pad may be decreased.

Figure 11A:
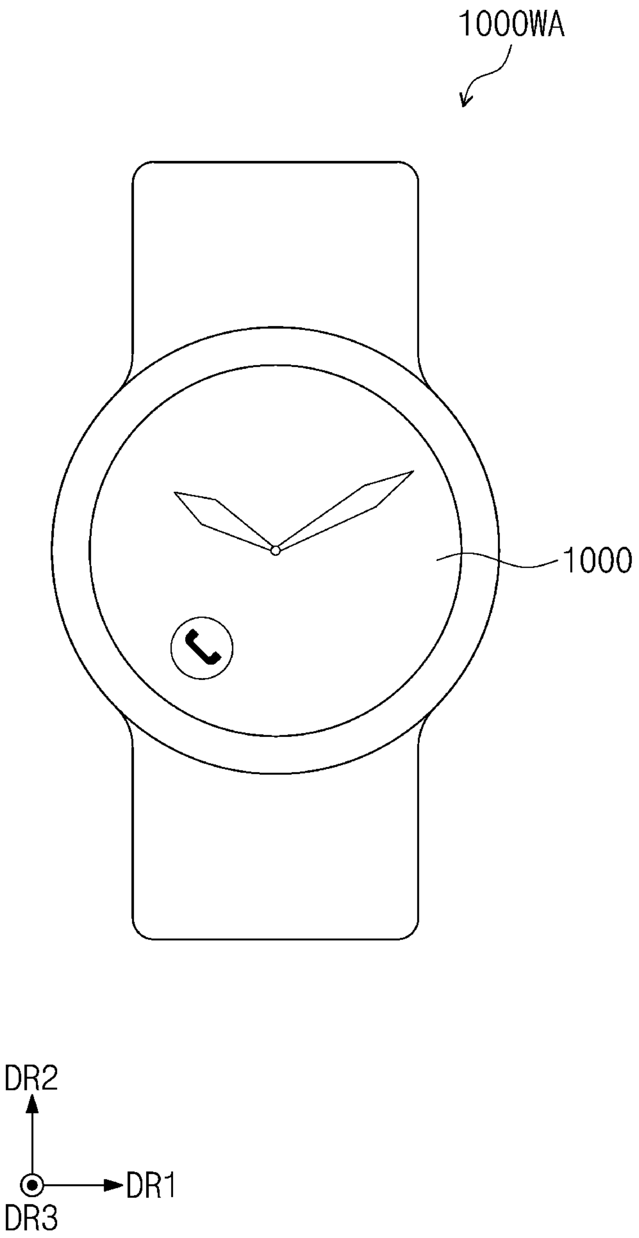
FIG. 11A is a cross-sectional view of an electronic device illustrating according to an embodiment of the inventive concept.
Figure 11B:
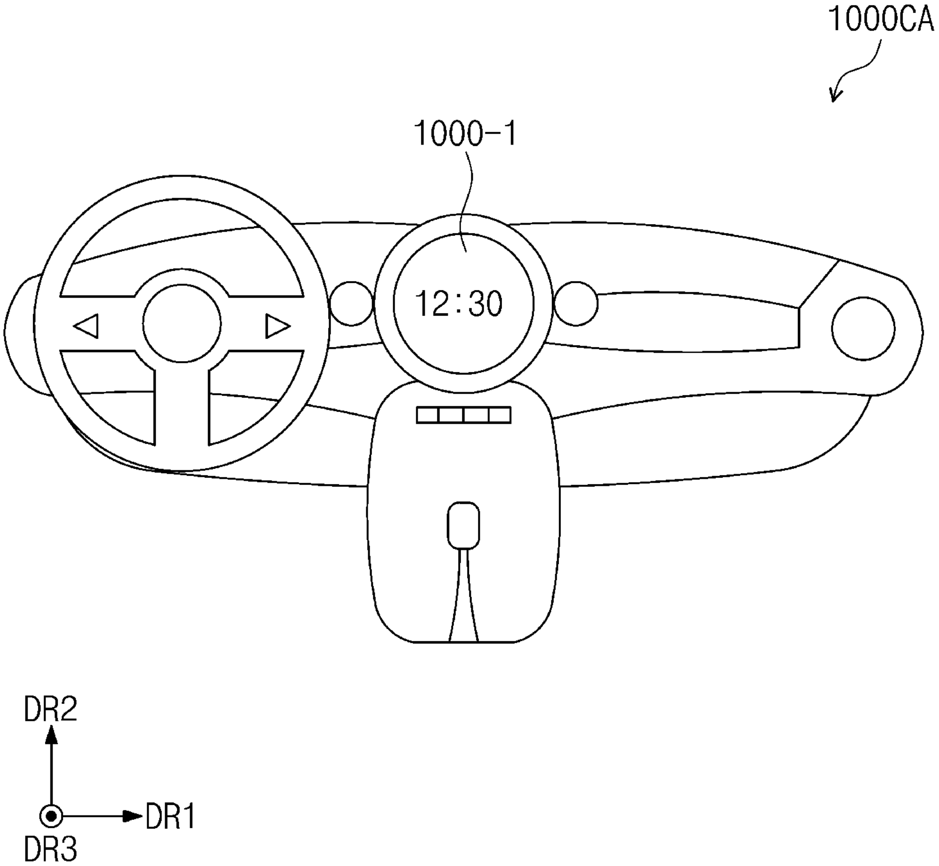
FIG. 11B is a cross-sectional view of an electronic device illustrating according to an embodiment of the inventive concept.

FIG. 11A is a cross-sectional view of an electronic device illustrating according to an embodiment of the inventive concept. FIG. 11B is a cross-sectional view of an electronic device illustrating according to an embodiment of the inventive concept. Electronic devices 1000 and 1000-1 illustrated in FIG. 11A and FIG. 11*b* may include the window 110 (see FIG. 5A) having the printing pattern 112 (see FIG. 5A), and the printing pattern 112 may be formed by using the printing pad PRP (see FIG. 6A) according to an embodiment of the inventive concept.

Referring to FIG. 11*a*, the electronic device 1000 may be applied to a wearable device 1000WA.

The electronic device 1000 may display time information, weather information, icons for executing various applications or operations, or the like. A user may operate the electronic device 1000 through a touch operation. The electronic device 1000 may be a circular shape.

Referring to FIG. 11B, the electronic device 1000-1 may be applied to a car 1000CA.

The electronic device 1000-1 may display an image, and may sense an external input applied from the outside. For example, the electronic device 1000-1 may display various types of information necessary for driving a car, for example, navigation information, or icons for operating various systems such as air conditioner, heater, audio, and air circulation, or may display images of the rear of the car 1000CA. A user may operate the electronic device 1000-1 through a touch operation.

FIG. 11A and FIG. 11B exemplarily illustrate two application examples to which the electronic devices 1000 and 1000-1 are applied, but the embodiment of the inventive concept may be applied without limitation as long as it has a circular-shaped region on which an image is displayed.

Figure 12:
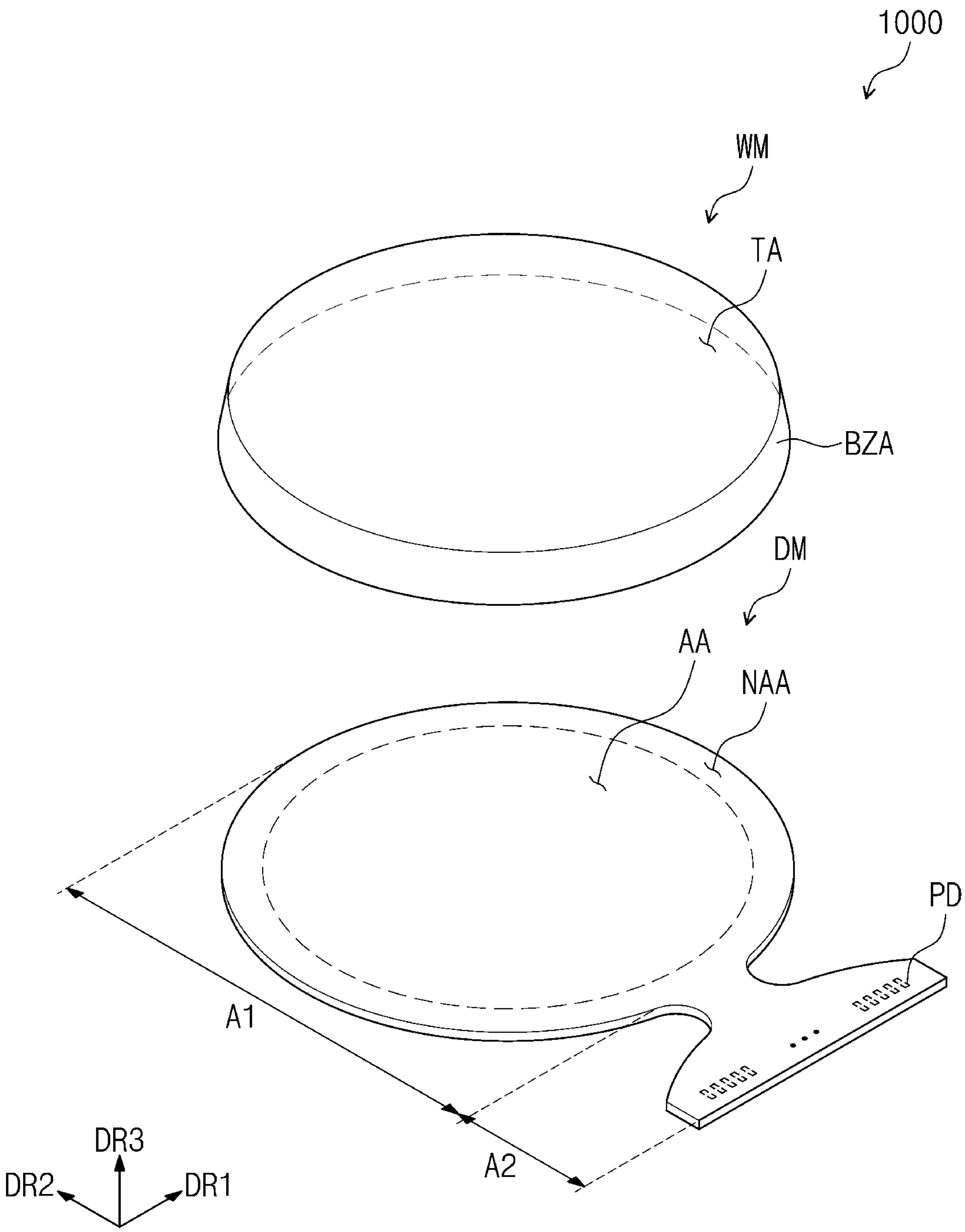
FIG. 12 is an exploded perspective view of an electronic device according to an embodiment of the inventive concept.

FIG. 12 is an exploded perspective view of an electronic device according to an embodiment of the inventive concept. FIG. 12 illustrates an exploded perspective view of the electronic device 1000 described with reference to FIG. 11A.

The electronic device 1000 may include a display module DM and the window WM.

The display module DM may include a first region A1 and a second region A2.

The first region A1 may have a circular shape on a plane. The second region A2 may have a width decreasing and then increasing in the first direction DR1 as the distance thereof from the first region A1 increases. A portion of the second region A2 having a decreasing width may be bent based on a predetermined axis extended in the first direction DR1.

The display module DM may include an active region AA and a peripheral region NAA.

The active region AA may be defined as a region which emits an image provided from the display module DM. The peripheral region NAA is adjacent to the active region AA. For example, the peripheral region NAA may surround the active region AA. The active region AA may be defined in a portion of the first region A1, and the peripheral region NAA may be defined in the remaining portion of the first region A1 and in the second region A2.

The second region A2 may include pads PD disposed adjacent to an end thereof. Although not illustrated, a circuit board including a driving element may be disposed on the pads PD to be electrically connected to the display module DM.

The window WM may be disposed on the display module DM to cover the display module DM. The window WM corresponds to a window WM to be described later in FIGS. 13A, 13B, 14A, and 14B. For a description of the shape of the window WM, refer to the description of FIGS. 13A, 13B, 14A, and 14B, which will be described later.

The window WM may include a transmissive region TA and a bezel region BZA.

The transmissive region TA may emit an image provided from the display module DM. According to an embodiment, at least a portion of the transmissive region TA may correspond to the active region AA of the display module DM.

The bezel region BZA may surround the transmissive region TA. Meanwhile, the bezel region BZA may be provided as a region in which a material including a predetermined color is printed in one region of the window WM. That is, a printing pattern 110 (see FIG. 5A) formed through printing pad PRP (see FIG. 6A) of the inventive concept may define the bezel region BZA of the window WM. Accordingly, the shape of the transmissive region TA may be substantially defined by the bezel region BZA.

Figure 13A:
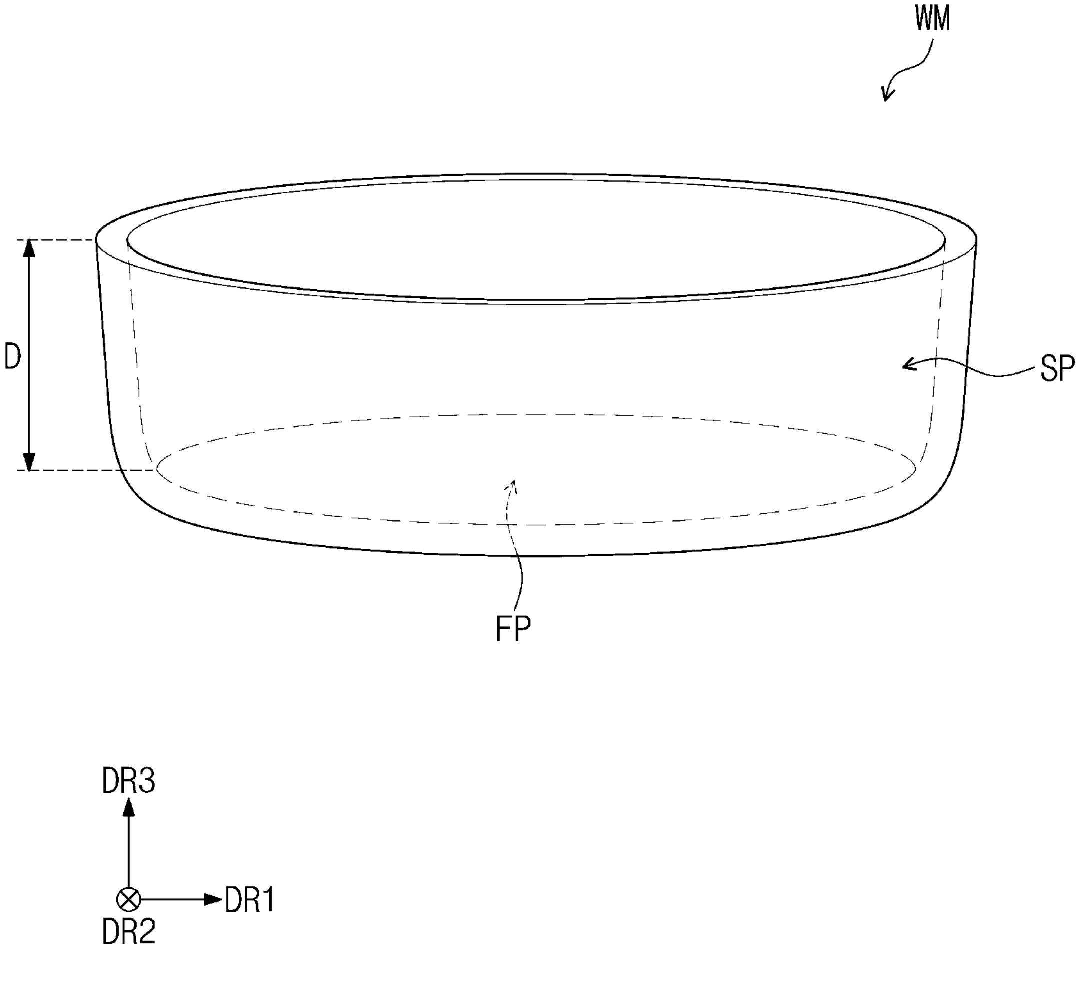
FIG. 13A is a perspective view of a window according to an embodiment of the inventive concept.
Figure 13B:
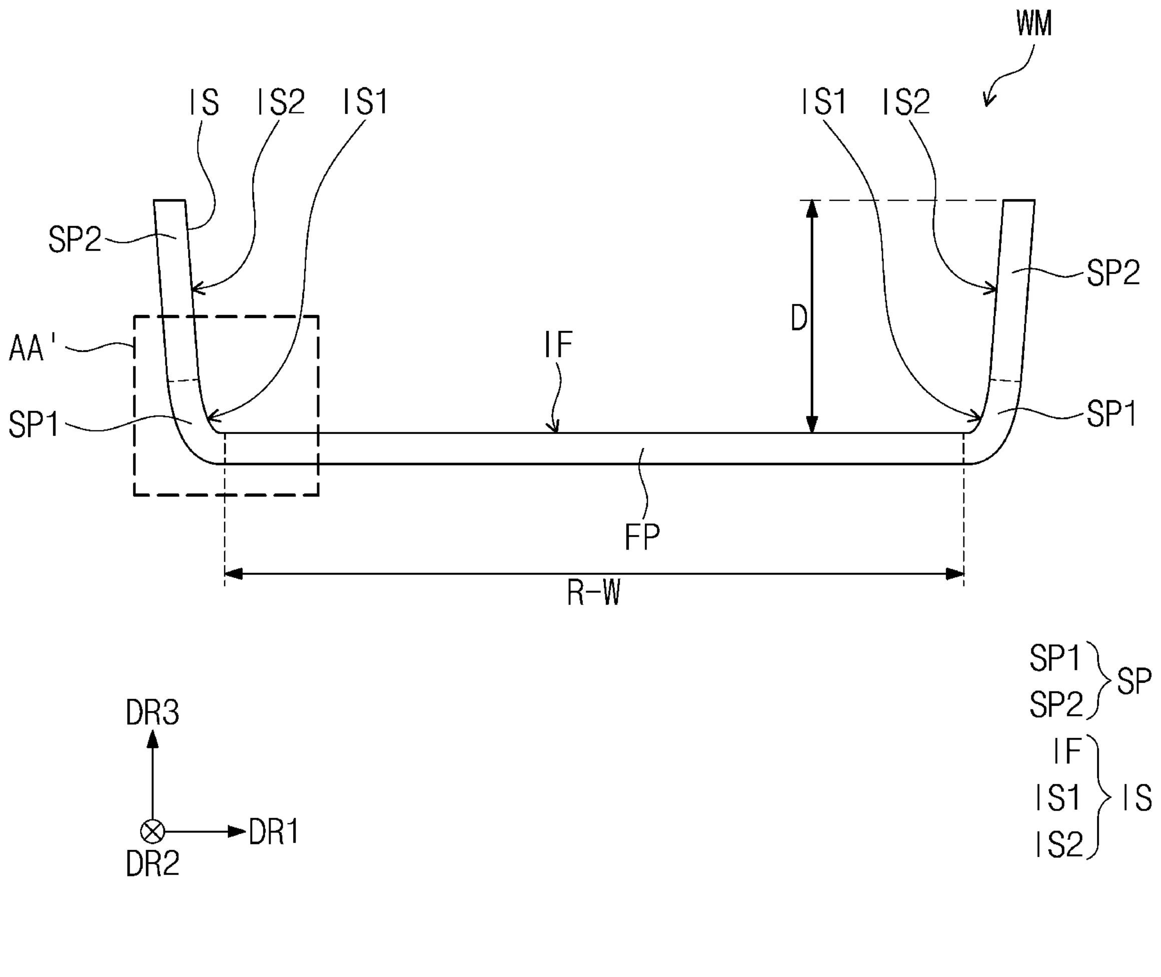
FIG. 13B is a cross-sectional view of a window according to an embodiment of the inventive concept.
Figure 14A:
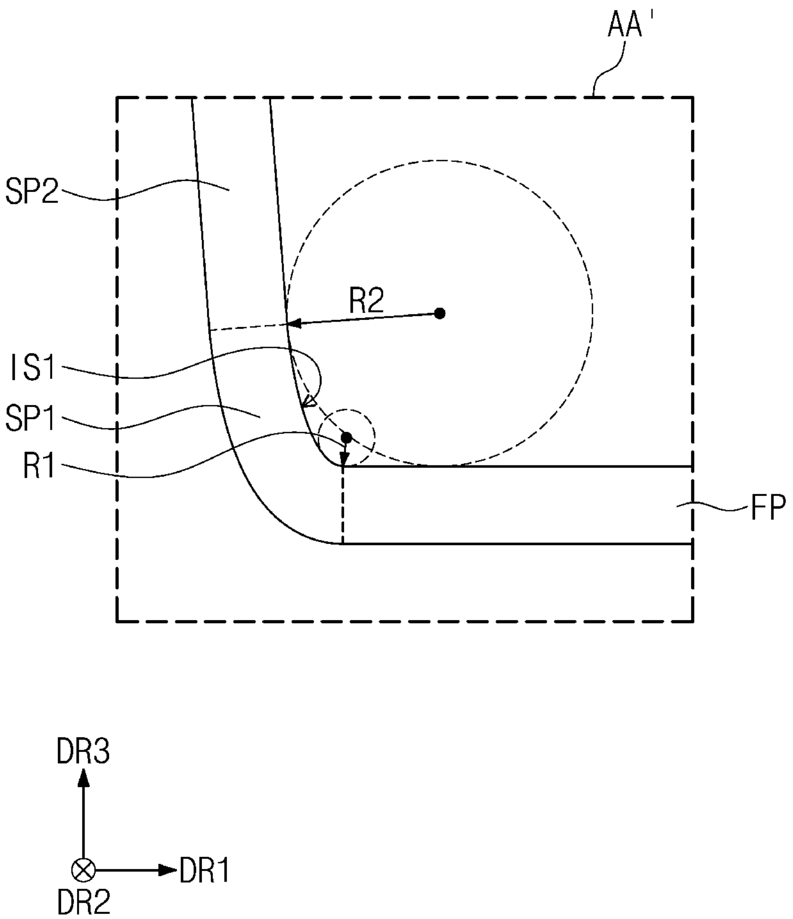
FIG. 14A is an enlarged cross-sectional view of region AA' of FIG. 13B.
Figure 14B:
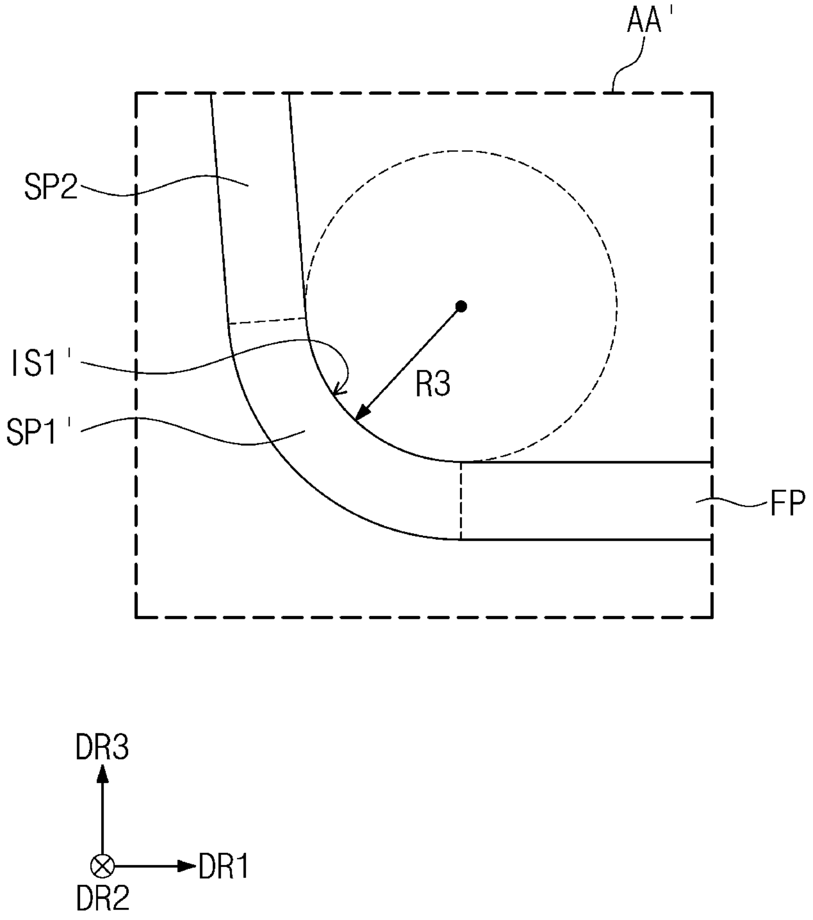
FIG. 14B is an enlarged cross-sectional view of region AA' of FIG. 13B.

FIG. 13A is a perspective view of a window according to an embodiment of the inventive concept. FIG. 13B is a cross-sectional view of a window according to an embodiment of the inventive concept. FIG. 14A is an enlarged cross-sectional view of region AA' of FIG. 13B. FIG. 14B is an enlarged cross-sectional view of region AA' of FIG. 13B.

Referring to FIG. 13A and FIG. 13B, the window WM may include a front surface portion FP and a side portion SP extended therefrom.

The front surface portion FP may be circular on a plane viewed from the third direction DR3. As illustrated in FIG. 13A and FIG. 13B, the front surface portion FP may be formed of a flat plate shape extended in the first direction DR1 and the second direction DR2. However, the embodiment of the inventive concept is not limited thereto, and the front surface portion FP may have a curvature. For example, the front surface portion FP may have a shape protruding from the side portion SP in a direction opposite to the third direction DR3. Therefore, in the present disclosure, a diameter R-W of the front surface portion FP means a diameter of the front surface portion FP on a plane viewed from the third direction DR3.

As illustrated in FIG. 13A and FIG. 13B, the side portion SP may be extended from the front surface portion FP to define a predetermined depth D of the window WM. The depth D of the window WM may be defined as a distance from a virtual surface formed by extending one end of the side portion SP, which is spaced apart from the front surface portion FP, in the first direction DR1 and the second direction DR2 to an inner surface IF of the front surface portion FP. According to the present embodiment, the depth D of the window WM may be about 2 mm to about 5 mm.

As illustrated in FIG. 13B, the side portion SP may include a first side portion SP1 and a second side portion SP2. The first side portion SP1 may be bent to have a curvature from the front surface portion FP. The second side portion unit SP2 may be extended from the first side portion SPL.

According to an embodiment, the second side portion SP2 may be extended from the first side portion SP1 to a constant slope. However, the embodiment of the inventive concept is not limited thereto, and the second side portion SP2 may have a shape bent to a curvature smaller than the curvature of the first side portion SP1.

The printing pad PRP (see FIG. 6A) of the inventive concept may transfer ink INK (see FIG. 7A) to an inner surface IS of the window WM in the window WM having the predetermined depth D. Among the inner surface IF of the front surface portion FP, an inner surface IS1 of the first side portion SP1, and an inner surface IS2 of the second side portion SP2, depending on a region to which the ink INK is transferred, the printing pattern 112 (see FIG. 5A) may be set.

The printing pad PRP (see FIG. 6A) according to the inventive concept may transfer the ink INK (see FIG. 7A) to the window WM to form the preset printing pattern 112 (see FIG. 5A) without a portion to which the ink INK (see FIG. 7A) is not attached.

FIG. 13A and FIG. 13B illustrate that the thickness of the window WM is uniform, but the embodiment of the inventive concept is not limited thereto, and the thickness of the window WM may be different from region to region. For example, the thickness of the front surface portion FP may be greater, or less than the thickness of the side portion SP. In addition, the thickness of the window WM may gradually change from the front surface portion FP to the side portion SP.

FIG. 14A and FIG. 14B illustrate enlarged views of the first side portion SP1 of the window WM (see FIG. 13B). Hereinafter, the shape of the first side portion SP1 will be described in detail.

Referring to FIG. 14A, the inner surface IS1 of the first side portion SP1 of the window WM may have a plurality of curvatures in a height direction of the first side portion SP1, that is, in the third direction DR3. For example, the inner surface IS1 of the first side portion SP1 may have a curvature increasing from the second side portion SP2 to the front surface portion FP. That is, one end portion of the front surface portion SP1 adjacent to the front surface portion FP may have a curvature larger than the other end portion of the front surface portion SP1 adjacent to the second side portion SP2.

At this time, as illustrated in FIG. 14A, the radius of curvature of the one end portion of the first side portion SP1 may be defined as a first radius of curvature R1, and the radius of curvature of the other end portion of the first side portion SP1 may be defined as a second radius of curvature R2. The first radius of curvature R1 may be smaller than the second radius of curvature R2.

FIG. 14A illustrates that the curvature of the one end portion of the first side portion SP1 is the largest, and the curvature of the other end portion of the first side portion SP1 is the smallest, but the embodiment of the inventive concept is not limited thereto. For example, the curvature of the one end portion of the first side portion SP1 may be the smallest, and the curvature of the other end portion of the first side portion SP1 may be the largest, or the curvature of a middle portion of the first side portion SP1 may be the largest.

FIG. 14A illustrates that the curvature of the inner surface IS1 of the first side portion SP1 gradually changes in the third direction DR3, but the embodiment of the inventive concept is not limited thereto. For example, the inner surface IS1 of the first side portion SP1 may be divided into a region having the first radius of curvature R1 and the region having the second radius of curvature R2.

Referring to FIG. 14B, unlike the first side portion SP1 illustrated in FIG. 13A to FIG. 14A, a first side portion SP1' according to an embodiment may have a constant curvature in a height direction of the first side portion SP1', that is, in the third direction DR3. At this time, the radius of curvature of the inner surface IS1' of the first side portion SP1' may be defined as a third radius of curvature R3.

Figure 15A:
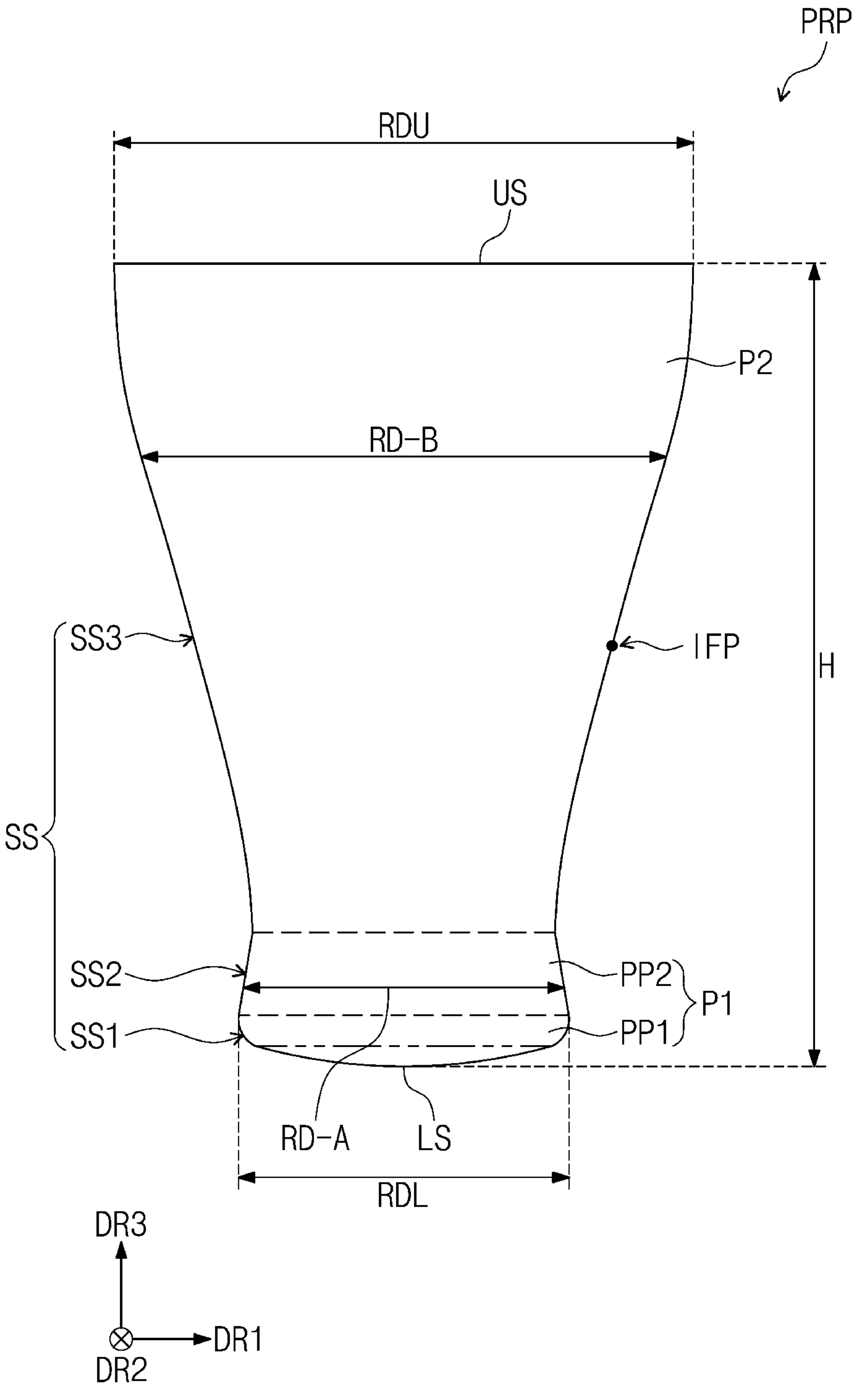
FIG. 15A is a cross-sectional view of a printing pad according to an embodiment of the inventive concept.
Figure 15B:
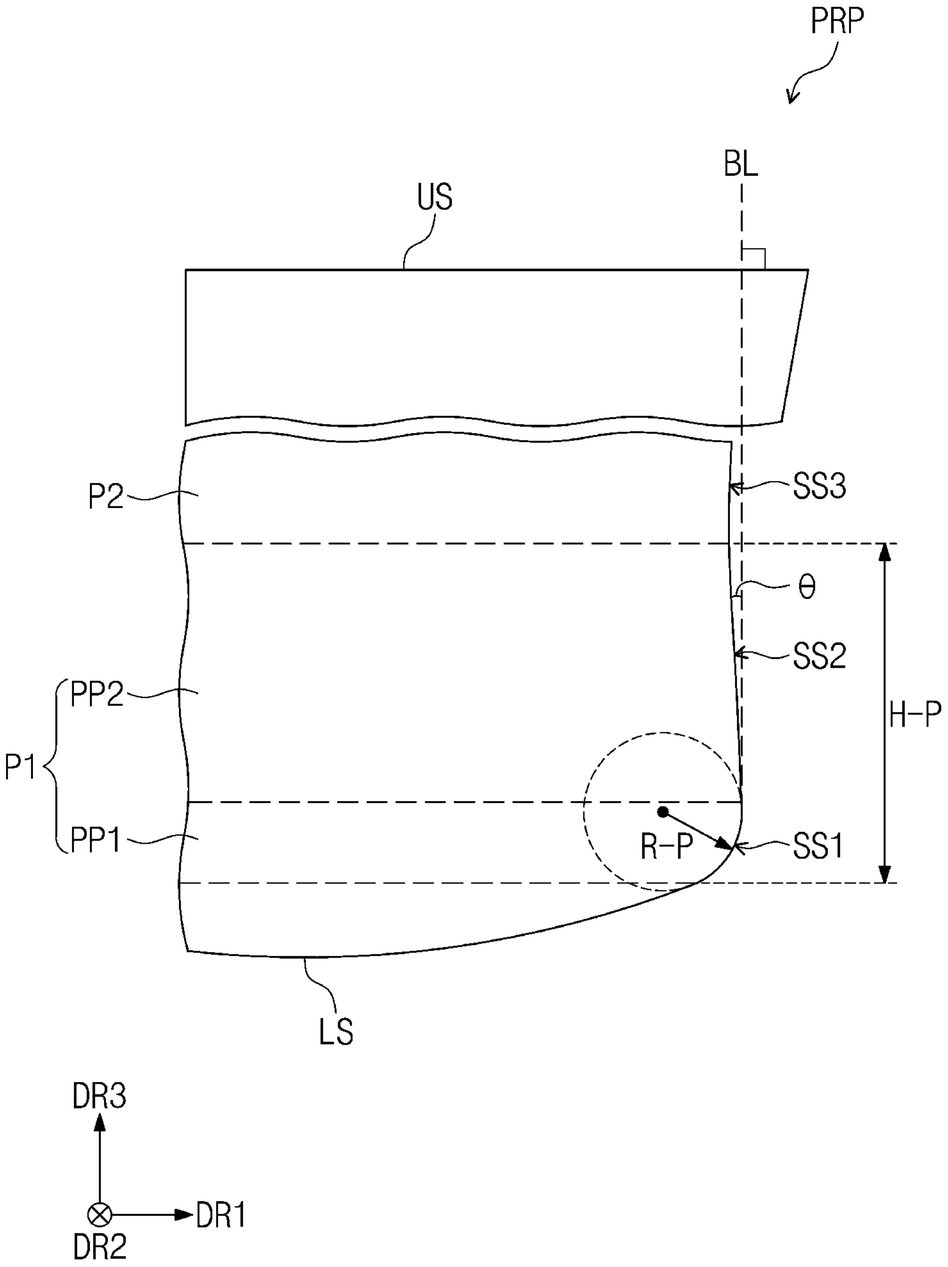
FIG. 15B is an enlarged cross-sectional view of a portion of a printing pad according to an embodiment of the inventive concept.

FIG. 15A is a cross-sectional view of a printing pad according to an embodiment of the inventive concept. FIG. 15B is an enlarged cross-sectional view of a portion of a printing pad according to an embodiment of the inventive concept. FIG. 15A and FIG. 15B illustrate cross-sections of a plane defined by the first direction DR1 and the third direction DR3.

Referring to FIG. 15A, the printing pad PRP may include a first portion P1 and a second portion P2. The first portion P1 may include a lower surface LS, the second portion may include an upper surface US. In the inventive concept, in a method for manufacturing the window 110 (see FIG. 3) to be described later, the first portion P1 may be a portion to which the ink INK (see FIG. 7A) is transferred.

The first portion P1 may include a curvature portion PP1 and an inclination portion PP2 extended therefrom.

The curvature portion PP1 may include the lower surface LS and a first side surface SS1. The first side surface SS1 may be a portion extended from the lower surface LS in a side surface SS of the printing pad PRP. The first side surface SS1 may be bent to a predetermined curvature from the lower surface LS. In the inventive concept, in the method for manufacturing the window 110 (see FIG. 3) to be described later, the first side surface SS1 may be a portion to which the ink INK (see FIG. 7A) is transferred.

The inclination portion PP2 is a portion having a predetermined inclination, and a diameter RD-A of the inclination portion PP2 may decrease as the distance from the curvature portion PP1 increases. A detailed description thereof will be described later with reference to FIG. 15B.

The inclination portion PP2 may include a second side surface SS2 extended from the first side surface SS1 in the side surface SS of the printing pad PRP. Unlike the first side surface SS1, the second side surface SS2 may not have a curvature with respect to a height direction of the printing pad PRP. In the inventive concept, in the method for manufacturing the window 110 (see FIG. 3), the second side surface SS2 may also be a portion to which the ink INK (see FIG. 7A) is transferred like the first side surface SS1.

The second portion P2 may be a portion extended from the first portion P1.

The second portion P2 may include the upper surface US and a third side surface SS3. The third side surface SS3 may be a portion extended from the second side surface SS2 to the upper surface LS in the side surface SS of the printing pad PRP.

A diameter RD-B of the second portion P2 may increase as the distance from the first portion P1 increases. At this time, the third side surface SS3 may be bent to a curvature with respect to the height direction of the printing pad PRP, that is, the third direction DR3.

According to an embodiment, as illustrated in FIG. 15A, the third side surface SS3 may have an inflection point IFP. The inflection point IFP may be defined as a point at which an inner curvature is transformed to an outer curvature in the third side surface SS3. The inner curvature may correspond to a curvature which the third side surface SS3 has in an upper portion of the second portion P2 with respect to the inflection point IFP. The outer curvature may correspond to a curvature which the third side surface SS3 has in a a lower portion of the second portion P2 with respect to the inflection point IFP. However, FIG. 15A exemplarily illustrates a shape in which the third side surface SS3 is bent, but is not limited to any one embodiment.

A diameter RDU of the upper surface US may be greater than the diameter RD-A of the inclination portion PP2 and a diameter (now shown) of the curvature portion PP1. That is, the second portion P2 may include a portion in which a diameter PD-B of the second portion P2 is greater than the diameter RD-A of the inclination portion PP2 and the diameter (now shown) of the curvature portion PP1. Through the above, in a process of pressurizing the printing pad PRP, the pressure transmitted to the first portion P1 may be increased, and the amount of expansion with respect to the first portion P1 may be increased. Therefore, it is possible to prevent defects such as an unprinted portion of the preset printing pattern WP (see FIG. 1) in the side portion SP (see FIG. 13A) of the window WM (see FIG. 13A).

According to an embodiment, a maximum diameter RDL of the curvature portion PP1 may be about 85% or more of the diameter R-W of the front surface portion FP of the window WM illustrated in FIG. 13B. Preferably, the maximum diameter RDL of the curvature portion PP1 may be about 90/of the diameter R-W of the front surface portion FP of the window WM.

When the maximum diameter RDL of the curvature portion PP1 is less than about 85% or more of the diameter R-W of the front surface portion FP of the window WM, the amount of expansion of the first portion P1 in the first direction DR1 and the second direction DR2 may be insufficient. Accordingly, the first portion P1 does not adhere to the side portion SP (see FIG. 13A) of the window WM, so that the ink INK may not be transferred.

According to an embodiment, the diameter RDU of the upper surface US may be about 1.5 times to about 2 times the maximum diameter of RDL of the curvature portion PP1. Preferably, the diameter RDU of the upper surface US may be about 1.75 times the maximum diameter of RDL of the curvature portion PP1.

When the diameter RDU of the upper surface US is less than about 1.5 times the maximum diameter of RDL of the curvature portion PP1, the second portion P2 becomes thin, so that in a process of pressurizing the printing pad module PM, the printing pad PRP may be bent, or since the pressure transmitted to the first portion is not sufficient, the amount of expansion of the first portion P1 may be insufficient. When the diameter RDU of the upper surface US is greater than about 2 times the maximum diameter of RDL of the curvature portion PP1, the difference between the diameter RD-B of the second portion P2 and the diameter RD-A of the inclined portion PP2 increases, so that the pressure transmitted to the first portion P1 may be distributed.

According to an embodiment, a height H of the printing pad PRP with respect to the third direction DR3 may be about 2 times to about 3 times the maximum diameter RDL of the curvature portion PP1. Preferably, a height from the most protruding portion of the lower surface LS to the upper surface US may be about 2.5 times the maximum diameter RDL of the curvature portion PP1.

When the height H of the printing pad PRP is less than about 2 times the maximum diameter RDL of the curvature portion PP1, the amount of expansion of the printing pad PRP with respect to the first direction DR1 is not sufficient, so that there may be an unprinted portion of the preset printing pattern WP (see FIG. 1). When the height H of the printing pad PRP is greater than about 3 times the maximum diameter RDL of the curvature portion PP1, the printing pad PRP is bent during the pressurizing of the printing pad PRP, so that there may be an unprinted portion of the preset printing pattern WP (see FIG. 1). For example, the ink INK (see FIG. 1) may be transferred only to one side surface of the inner surface IS (see FIG. 13B) of the side portion SP (see FIG. 13B) of the window WM (see FIG. 13B) based on a horizontal direction.

FIG. 15B is an enlarged view of the first side surface SS1 of the curvature portion PP1 and the second side surface SS2 of the curvature portion PP2 in the printing pad PRP. Hereinafter, the shape of the first side surface SS1 and the shape of the second side surface SS2 will be described in detail.

Referring to FIG. 15B, the first side surface SS1 of the curvature portion PP1 according to an embodiment may be have a constant curvature.

As in the case of the window WM (see FIG. 13B) according to an embodiment described with reference to FIG. 14A, when the printing pattern WP (see FIG. 1) is formed on the window WM having a plurality of curvatures of the inner surface IS1 of the first side portion SP1, the first side surface SS1 may have the same curvature as the maximum curvature of the inner surface IS1 of the first side portion SP1. That is, a radius of curvature R-P of the first side surface SS1 may be the same as the first radius of curvature R1 (see FIG. 14A).

As in the case of the window WM (see FIG. 13B) according to an embodiment described with reference to FIG. 14B, when the printing pattern WP (see FIG. 1) is formed on the window WM having a constant curvature of the inner surface IS1' of the first side portion SP1', the first side surface SS1 may have the same curvature as the curvature of the inner surface IS1' of the first side portion SP1'. That is, the radius of curvature R-P of the first side surface SS1 may be the same as the third radius of curvature R3 (see FIG. 14B).

When the curvature of the first side surface SS1 of the curvature portion PP1 is smaller than the maximum value of the curvature of the first side portion SP1 of the window WM, the inclination portion PP2 may not adhere to a portion in which the curvature of the first side portion SP1 is larger than the curvature of the first side surface SS1 in the first side portion SP1. In addition, when the curvature of the first side surface SS1 of the curvature portion PP1 is larger than the maximum value of the curvature of the first side portion SP1 of the window WM, the printing pad PRP may not expand enough to adhere to the entire inner surface IS1 of the first side portion SP1. Therefore, when the curvature of the first side surface SS1 is either smaller or larger than the maximum value of the curvature of the inner surface IS1 of the first side portion SP1, there may be defects such as an unprinted portion formed on a portion of the inner surface IS1 of the first side portion SP1.

The second side surface SS2 of the inclination portion PP2 according to an embodiment may be extended inclined to a certain angle from the first side surface SS1.

According to an embodiment, an angle θ of an interior angle formed by a base line BL extended in a normal direction of the upper surface US and the second side surface SS2 may be greater than about 4 degrees. That is, the second side surface SS2 may have an inclination of less than about 86 degrees with respect to the plane defined by the first direction DR1 and the second direction DR2.

According to the inventive concept, as the diameter RD-A (see FIG. 15A) of the inclination portion PP2 decreases in the third direction DR3, pressure may be sufficiently transmitted to the first portion P1 in the process of pressurizing the printing pad PRP, and the amount of expansion of the first portion P1 may also be sufficient. Accordingly, since the inclination portion PP2 of the printing pad PRP sufficiently adheres to the entire inner surface IS2 (see FIG. 13B) of the second side portion SP2 (see FIG. 13B) of the window WM, the ink INK may be transferred to the entire inner surface IS2 of the second side portion SP2. That is, it is possible to prevent defects such as an unprinted portion of the printing pattern WP (see FIG. 1) in the inner surface IS2 of the second side portion SP2.

According to an embodiment, when the maximum diameter RDL (see FIG. 15A) of the curvature portion PP1 is set to about 90% of the diameter R-W (see FIG. 13B) of the front surface portion FP (see FIG. 13B) of the window WM (see FIG. 13B), the angle θ of the interior angle formed by the base line BL extended in the normal direction of the upper surface US and the second side surface SS2 may be greater than about 4 degrees and less than about 10 degrees.

When the angle θ of the interior angle is about 10 degrees or more, as the diameter RD-A of the inclination portion PP2 adjacent to the second portion P2 decreases, there may be an unprinted portion since the printing pad PRP is bent during the pressurizing of the printing pad PRP.

According to an embodiment, a minimum height H-P of the first portion P1 in the third direction DR3 may be greater than or equal to the depth D of the window WM (see FIG. 13A). When the minimum height H-P of the first portion P1 is less than the depth D of the window WM, there may be an unprinted portion of the printing pattern WP at an end of the inner surface IS2 of the second side portion SP2 of the window WM.

Although the present inventive concept has been described with reference to non-limiting embodiments thereof, it will be understood by those skilled in the art that various changes in form and details may be made therein without departing from the spirit and scope of the present inventive concept. Accordingly, the scope of the present inventive concept is not intended to be limited to embodiments set forth in the detailed description of the specification.

What is claimed is:

1. A printing pad comprising:

a first portion including a bottom surface extending in a plane defined in a first direction and a second direction intersecting the first direction, a first upper surface facing the bottom surface, and a first side surface connecting the bottom surface and the first upper surface; and a second portion disposed on the first portion and including a second upper surface facing the first upper surface and a second side surface connecting the first upper surface and the second upper surface, wherein a first material included in the first portion and a second material included in the second portion are different from each other, wherein a width of the second portion in the first direction increases from the first upper surface towards the second upper surface, wherein an angle of the second side surface with respect to a third direction perpendicular to the bottom surface from a lower portion of the second side surface proximate to the first upper surface to an upper portion of the second side surface proximate to the second upper surface is in a range of about 10° to about 12°, wherein an upper portion of the first side surface directly contacting the second side surface is inwardly curved and the upper portion of the first side surface and the second side surface together form a concave shape, wherein the second side surface extends linearly in the range of about 10° to about 12° from the concave shape to the upper portion of the second side surface proximate to the second upper surface, and wherein the upper portion of the second side surface proximate to the upper surface is rounded and directly contacts the linearly extending second side surface.

2. The printing pad of claim 1, wherein each of the first portion and the second portion comprises rubber or silicone.

3. The printing pad of claim 1, wherein:

a hardness of the first portion is in a range of about 20 sh A to about 35 sh A; and a hardness of the second portion is in a range of about 7 sh A to about 15 sh A.

4. The printing pad of claim 1, wherein the width of the first portion in the first direction decreases from the bottom surface toward the first upper surface.

5. The printing pad of claim 1, wherein:

a planar area of the bottom surface in the plane defined in the first direction and the second direction is greater than a planar area of the first upper surface in the plane defined in the first direction and the second direction; and a planar area of the second upper surface in the plane defined in the first direction and the second direction is greater than the planar area of the first upper surface in the plane defined in the first direction and the second direction.

6. The printing pad of claim 1, wherein the second upper surface has a curved shape protruding in a direction away from the first portion.

7. The printing pad of claim 1, wherein the first side surface comprises:

a first sub-side surface extending from the bottom surface and having a first slope from the bottom surface; and a second sub-side surface extending from the first sub-side surface and directly connected to the first upper surface, the second sub-side surface having a second slope that is less than the first slope.

8. The printing pad of claim 1, wherein:

the first portion has a first height with respect to a third direction perpendicular to the bottom surface;

the second portion has a second height with respect to the third direction; and a ratio of the first height to the second height is in a range of about 5:5 to about 7:3.

9. A method for manufacturing a window, the method comprising:

adhering ink to a printing pad; and pressurizing the printing pad to which the ink is adhered on a window base portion of the window to provide a printing pattern on the window base portion, wherein the printing pad includes:

a first portion including a bottom surface extending in a plane defined in a first direction and a second direction intersecting the first direction, a first upper surface facing the bottom surface, and a first side surface connecting the bottom surface and the first upper surface; and a second portion disposed on the first portion and including a second upper surface facing the first upper surface and a second side surface connecting the first upper surface and the second upper surface, wherein a width of the second portion in the first direction increases from the first upper surface towards the second upper surface, wherein an angle of the second side surface with respect to a third direction perpendicular to the bottom surface from a lower portion of the second side surface proximate to the first upper surface to an upper portion of the second side surface proximate to the second upper surface is in a range of about 10° to about 12°, wherein an upper portion of the first side surface directly contacting the second side surface is inwardly curved and the upper portion of the first side surface and the second side surface together form a concave shape, wherein the second side surface extends linearly in the range of about 10° to about 12° from the concave shape to the upper portion of the second side surface proximate to the second upper surface, and wherein the upper portion of the second side surface proximate to the second upper surface is rounded and directly contacts the linearly extending second side surface.

10. The method of claim 9, wherein the adhering of the ink to the printing pad comprises:

disposing the ink on a printing plate; and pressurizing the printing pad on the printing plate.

11. The method of claim 10, further comprising:

adhering additional ink to an additional printing pad; and pressurizing the additional printing pad to which the additional ink is adhered on the window base portion having the printing pattern to provide an additional printing pattern on the printing pattern.

12. The method of claim 11, wherein the additional printing pad includes:
a third portion; and
a fourth portion disposed on the third portion, wherein a width of the fourth portion in the first direction decreases as a distance from the third portion increases, or the width of the fourth portion in the first direction remains the same as a distance from the third portion increases.

13. The method of claim 11, wherein the adhering of additional ink to an additional printing pad comprises:
disposing the additional ink on an additional printing plate; and
pressurizing the additional printing pad on the additional printing plate, wherein:
the ink is provided as a plurality of patterns spaced apart at a first interval on the printing plate;
the additional ink is provided as a plurality of patterns spaced apart at a second interval on the additional printing plate; and
the second interval is less than the first interval.

14. The method of claim 9, wherein the window base portion comprises:
a main transmissive portion extending in a plane defined in the first direction and the second direction; and
at least one side transmissive portion extending from the main transmissive portion and bent to a predetermined curvature,
wherein an angle formed by an end of the at least one side transmissive portion with respect to the plane of the main transmissive portion is in a range of about 90° or greater.

15. A method for manufacturing a printing pad, the method comprising:
providing a mold having a first opening having a first width in a first direction and a second opening having a second width that is less than the first width in the first direction;
providing a first elastic material into the second opening;
providing a second elastic material into the first opening, the second elastic material is different from the first elastic material; and
drying the first and second elastic material,
wherein the second width of the second opening increases as a distance from the first opening increases, and wherein an angle of a side surface of the second opening with respect to a thickness direction of the mold from an upper portion of the second opening proximate to the first opening to a lower portion of the second opening proximate to a bottom surface of the mold is in a range of about 10° to about 12°,
wherein a portion of the first opening directly contacting the second opening is inwardly curved,
wherein the dried first and second elastic material in the mold forms a concave shape by the inwardly curved portion of the first opening and the second opening, wherein the dried first elastic material extends linearly in the range of about 10° to about 12° from the concave shape to the lower portion of the second opening proximate to the bottom surface of the mold, and
wherein a portion of the dried first elastic material directly contacting the linearly extending dried first elastic material is rounded.

16. The method of claim 15, wherein the first elastic material has a smaller hardness than the second elastic material.

17. A system for manufacturing a window for a display device, comprising:
a printing pad configured to provide a printing pattern on the window, the printing pad comprising:
a first portion having a bottom surface, a first upper surface and a first side surface connecting the bottom surface and the first upper surface; and
a second portion disposed on the first upper surface and including a second upper surface facing the first upper surface and a second side surface connecting the first upper surface and the second upper surface, an angle of the second side surface with respect to a direction perpendicular to the bottom surface from a lower portion of the second side surface proximate to the first upper surface to an upper portion of the second side surface proximate to the second upper surface is in a range of about 10° to about 12°, wherein an upper portion of the first side surface directly contacting the second side surface is inwardly curved and the upper portion of the first side surface and the second side surface together form a concave shape, wherein the second side surface extends linearly in the range of about 10° to about 12° from the concave shape to the upper portion of the second side surface proximate to the second upper surface, wherein the upper portion of the second side surface proximate to the second upper surface is rounded and directly contacts the linearly extending second side surface,
the window includes a window base portion, comprising:
a main transmissive portion extending in a plane defined in a first direction and a second direction intersecting the first direction; and
at least one side transmissive portion extending from the main transmissive portion and bent to a predetermined curvature, wherein an angle formed by an end of the at least one side transmissive portion with respect to the plane of the main transmissive portion is in a range of about 90° or greater,
wherein the printing pad is configured to have ink adhered on the second side surface to provide the printing pattern on the at least one side transmissive portion of the window base portion when the printing pad is pressurized on the window base portion.

18. The system of claim 17, further including an additional printing pad configured to provide an additional printing pattern on a portion of the printing pattern provided on the at least one side transmissive portion when the additional printing pad is pressurized on the window, the additional printing pad including a third portion and a fourth portion disposed on the third portion.

* * * * *